United States Patent
Chen et al.

(10) Patent No.: US 12,093,620 B1
(45) Date of Patent: Sep. 17, 2024

(54) MULTI-CYCLE POWER ANALYSIS OF INTEGRATED CIRCUIT DESIGNS

(71) Applicant: Synopsys, Inc., Sunnyvale, CA (US)

(72) Inventors: George Guangqiu Chen, Cupertino, CA (US); Solaiman Rahim, San Francisco, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 0 days.

(21) Appl. No.: 18/385,285

(22) Filed: Oct. 30, 2023

Related U.S. Application Data

(62) Division of application No. 17/690,992, filed on Mar. 9, 2022, now Pat. No. 11,842,132.

(51) Int. Cl.
 *G06F 30/30* (2020.01)
 *G06F 30/3315* (2020.01)
 *G06F 119/06* (2020.01)
 *G06F 119/12* (2020.01)

(52) U.S. Cl.
 CPC ...... *G06F 30/3315* (2020.01); *G06F 2119/06* (2020.01); *G06F 2119/12* (2020.01)

(58) Field of Classification Search
 CPC ............. G06F 30/3315; G06F 2119/06; G06F 2119/12
 See application file for complete search history.

(56) References Cited

U.S. PATENT DOCUMENTS

| | | | | |
|---|---|---|---|---|
| 8,495,541 | B2 * | 7/2013 | Omura | G06F 30/3315 716/136 |
| 9,201,994 | B1 * | 12/2015 | Tripathi | G06F 30/30 |
| 2005/0050481 | A1 * | 3/2005 | Keller | G06F 30/33 716/109 |
| 2006/0001428 | A1 * | 1/2006 | Milne | G01V 3/083 324/360 |
| 2006/0277509 | A1 * | 12/2006 | Tung | G06F 30/33 716/109 |
| 2008/0092092 | A1 * | 4/2008 | Dalton | G06F 30/33 716/108 |
| 2009/0031268 | A1 * | 1/2009 | Miranda | G06F 30/3312 716/113 |

(Continued)

*Primary Examiner* — Jack Chiang
*Assistant Examiner* — Brandon Bowers
(74) *Attorney, Agent, or Firm* — Lewis Roca Rothgerber Christie LLP

(57) ABSTRACT

A method includes: receiving value changes corresponding to timestamped logic value changes in recorded signals from a verification run of an integrated circuit (IC) design; generating recorded logic vectors from the value changes, each of the recorded logic vectors being associated with a corresponding signal identifier, each of the recorded logic vectors including a recorded logic values over a window of consecutive clock cycles computed from one or more value changes associated with the corresponding signal identifier and having timestamps within the window of consecutive clock cycles; determining, by a processor, inferred logic vectors including inferred logic values corresponding to signals output by cells of the IC design based on propagating the recorded logic values of the recorded logic vectors through the cells; and computing per-cycle power characteristics of the IC design based on the recorded logic vectors and the inferred logic vectors.

20 Claims, 15 Drawing Sheets

(56) References Cited

U.S. PATENT DOCUMENTS

2014/0052930 A1\* 2/2014 Gulati ................ G06F 11/3636
                                                      714/45
2015/0025857 A1\* 1/2015 Arsovski ................ G06F 30/30
                                                      703/2

\* cited by examiner

MULTI-CYCLE POWER ANALYSIS OF INTEGRATED CIRCUIT DESIGNS

CROSS-REFERENCE TO RELATED APPLICATION(S)

The present application is a divisional of U.S. patent application Ser. No. 17/690,992, filed Mar. 9, 2022, the entire contents of which are incorporated herein by reference.

TECHNICAL FIELD

The present disclosure generally relates to an electronic design automation (EDA) system. In particular, the present disclosure relates to a system and method for estimating the power consumption of integrated circuit designs.

BACKGROUND

Power analysis in the context of integrated circuit design relates to estimating or predicting the electrical power consumption of an integrated circuit based on its design, such as the layout, connection, and power characteristics of individual cells of the integrated circuit. The estimated power consumption values are used to evaluate, for example, whether the integrated circuit design meets various specifications or constraints, such as average power consumption and peak power consumption during operation. These electrical power consumption characteristics impact the applications for the integrated circuit. For example, high power consumption increases the cooling requirements to keep the integrated circuit within an operating temperature range. As another example, high power consumption impacts the battery life of portable electronics and impacts the power load of computing devices operating in environments with power constraints, such as in data centers having power budgets.

SUMMARY

According to one embodiment of the present disclosure, a method includes: receiving a plurality of value changes corresponding to timestamped value changes in a plurality of recorded signals from a verification run of an integrated circuit design; generating a plurality of recorded logic vectors from the plurality of value changes, each of the plurality of recorded logic vectors being associated with a corresponding signal identifier, each of the plurality of recorded logic vectors including a plurality of recorded logic values over a window of consecutive clock cycles computed from one or more logic value changes of one or more value changes associated with the corresponding signal identifier and having timestamps within the window of consecutive clock cycles; determining, by a processor, a plurality of inferred logic vectors including a plurality of inferred logic values corresponding to signals output by a plurality of cells of the integrated circuit design by propagating the plurality of recorded logic values of the plurality of recorded logic vectors through the plurality of cells; and computing per-cycle power characteristics of the integrated circuit design based on the plurality of recorded logic vectors and the plurality of inferred logic vectors.

The plurality of inferred logic values of the window of consecutive clock cycles may be computed in parallel.

The processor may include an arithmetic logic unit configured to perform operations on one or more operands, each operand having a bit width, a length of the window of consecutive clock cycles of the plurality of recorded logic vectors may be is less than or equal to the bit width, and each logic vector among the plurality of recorded logic vectors and the plurality of inferred logic vectors may be stored in a single data word.

The method may further include: determining a level of a cell of the plurality of cells of the integrated circuit design based on a maximum number of stages through the integrated circuit design from a recorded signal to an input of the cell, wherein the propagating the plurality of recorded logic vectors through the plurality of cells of the integrated circuit design comprises adding the plurality of cells of the integrated circuit design to a queue in an order of the level.

The method may further include compiling bitwise operation implementations of behaviors of the cells of the integrated circuit design, the behaviors of the cells including logic functions mapping inputs to the cells to outputs of the cells (e.g., computing the outputs of the cells based on the inputs to the cells), and the propagating the recorded logic values through the plurality of cells of the integrated circuit design may include: adding the cells of the integrated circuit design to a queue in order of level; and for each cell in the queue, supplying logic vectors provided as inputs to the cell to a corresponding compiled bitwise operation implementation of the behavior of the cell to compute the plurality of inferred logic vectors.

The method may further include dividing the plurality of cells of the integrated circuit design into a plurality of clusters including a first cluster of cells and a second cluster of cells, where the first cluster and the second cluster are independent of one another for logic propagation, wherein the propagating the plurality of recorded logic vectors through the plurality of cells of the integrated circuit design may include: propagating the plurality of recorded logic vectors through the first cluster of cells in a first thread executed by a first core of the processor; and concurrently propagating the plurality of recorded logic vectors through the second cluster of cells in a second thread executed by a second core of the processor.

The computing the per-cycle power characteristics may include: computing a plurality of cell states of the plurality of cells based on the plurality of recorded logic vectors and the plurality of inferred logic vectors; and computing power characteristics of each cell for each cycle based on a previous cell state during a previous cycle and a current cell state during a current cycle.

The method may further include caching the computed power characteristics in a cache in association with the previous cell state and the current cell state.

The method may further include determining that the cache includes an entry for the cell for the previous cell state and the current cell state; and associating power characteristics from the cache with the current cycle of the cell.

The method may further include determining that the cache does not include an entry for the cell in association with the previous cell state and the current cell state; computing the power characteristics based on transitions determined from the previous cell state and the current cell state and static timing analysis of the cell; and caching the computed power characteristics in the cache in association with the previous cell state and the current cell state.

The generating the plurality of recorded logic vectors from the plurality of value changes may be performed by a first thread executed by a first core of the processor, and the propagating the plurality of recorded logic values of the plurality of recorded logic vectors through the plurality of cells of the integrated circuit design may be performed by a second thread executed by a second core of the processor. The computing the per-cycle power characteristics of the integrated circuit design may include: computing, by a first thread of a plurality of threads executed by the processor, per-cell power characteristics for a first window of clock cycles; and computing, by a second thread of the plurality of threads executed by the processor concurrently with the first thread, power characteristics for a second window of clock cycles different from the first window of clock cycles.

According to one embodiment of the present disclosure, a system includes: a memory storing instructions; and a processor including an arithmetic logic unit configured to perform arithmetic operations on one or more operands, each operand having a bit width, coupled with the memory and to execute the instructions, the instructions when executed cause the processor to: receive a plurality of value changes corresponding to timestamped logic value changes in a plurality of recorded signals from a verification run of an integrated circuit design; generate a plurality of recorded logic vectors from the plurality of value changes, each recorded logic vector including a plurality of recorded logic values over a window of consecutive clock cycles for a recorded signal of the plurality of recorded signals, each logic vector having a length less than or equal to the bit width and being stored in a single data word having a size equal to the bit width; determine a plurality of inferred logic vectors including a plurality of inferred logic values corresponding to signals output by a plurality of cells of the integrated circuit design based on propagating the plurality of recorded logic values through a plurality of cells; compute per-cycle power characteristics of the integrated circuit design based on the plurality of recorded logic vectors and the plurality of inferred logic vectors; and output the per-cycle power characteristics of the integrated circuit design in order of timestamp from the verification run.

The plurality of inferred logic values of the window of consecutive clock cycles may be computed in parallel.

The memory may further store instructions when executed cause the processor to: determine a level of each cell in the integrated circuit design based on a maximum number of steps through the integrated circuit design from a recorded signal to an input of the cell; and wherein the instructions to propagate the plurality of recorded logic values through the plurality of cells of the integrated circuit design comprise instructions that when executed cause the processor to add the plurality of cells of the integrated circuit design to a queue in order of level.

The memory may further store instructions when executed cause the processor to compile bitwise operation implementations of behaviors of the plurality of cells of the integrated circuit design, the behaviors of the plurality of cells comprising logic functions mapping inputs to the plurality of cells to outputs of the plurality of cells, and the instructions to propagate the plurality of recorded logic vectors through the plurality of cells of the integrated circuit design may include instructions that when executed cause the processor to, for each cell in the queue, supply logic vectors provided as inputs to the cell to a corresponding compiled bitwise operation implementation of the behavior of the cell to compute the plurality of inferred logic vectors.

The memory may further store instructions when executed cause the processor to divide the plurality of cells of the integrated circuit design into a plurality of clusters including a first cluster of cells and a second cluster of cells, where the first cluster and the second cluster are independent of one another for logic propagation, and wherein the instructions to propagate the plurality of recorded logic vectors through the plurality of cells of the integrated circuit design may include instructions that when executed cause the processor to: propagate the plurality of recorded logic vectors through the first cluster of cells in a first thread executed by a first core of the processor; and concurrently propagate the plurality of recorded logic vectors through the second cluster of cells in a second thread executed by a second core of the processor.

The instructions to compute the per-cycle power characteristics may include instructions when executed cause the processor to: compute a plurality of cell states of the plurality of cells based on the plurality of recorded logic vectors and the plurality of inferred logic vectors; compute power characteristics of each cell for each cycle based on a previous cell state during a previous cycle and a current cell state during a current cycle; and store the computed power characteristics in a cache in association with the previous cell state and the current cell state.

The instructions may further include instructions that when executed cause the processor to compute the power characteristics by: determining that the cache includes an entry for the cell in association with the previous cell state and the current cell state; and associating the power characteristics from the cache with the current cycle of the cell. The instructions may further include instructions that when executed cause the processor to compute the power characteristics by: determining that the cache does not include an entry for the cell in association with the previous cell state and the current cell state; computing the power characteristics based on transitions determined from the previous cell state and the current cell state and static timing analysis of the cell; and caching the computed power characteristics in the cache in association with the previous cell state and the current cell state.

According to one embodiment of the present disclosure, a non-transitory computer readable medium includes stored instructions that, when executed by a processor, cause the processor to: generate a plurality of recorded logic vectors from a plurality of value changes from a verification run of an integrated circuit design, each recorded logic vector including a plurality of recorded logic values over a window of consecutive clock cycles, each logic vector having a length less than or equal to a bit width of an arithmetic logic unit of the processor and being stored in a single data word having a size equal to the bit width; determine a plurality of inferred logic vectors including a plurality of inferred logic values corresponding to signals output by a plurality of cells of an integrated circuit design based on propagating the plurality of recorded logic values through the plurality of cells; and compute per-cycle power characteristics of the integrated circuit design based on the plurality of recorded logic vectors and the plurality of inferred logic vectors.

The stored instructions may further include instructions that, when executed by the processor, cause the processor to compute the plurality of inferred logic values of the window of consecutive clock cycles in parallel.

The non-transitory computer readable medium may further store instructions that when executed cause the processor to: determine a level of each cell in the integrated circuit design based on a maximum number of steps through the integrated circuit design from a recorded signal to an input of the cell; and compile bitwise operation implementations of behaviors of the cells of the integrated circuit design, the behaviors of the cells including logic functions mapping inputs to the cells to outputs of the cells.

The instructions may further include instructions that when executed cause the processor to: add the plurality of cells of the integrated circuit design to a queue in order of level; and for each cell in the queue, supply logic vectors provided as inputs to the cell to a corresponding compiled bitwise operation implementation of a behavior of the cell to compute the plurality of inferred logic vectors.

The instructions may further include instructions that when executed cause the processor to: compute a plurality of cell states of the plurality of cells based on the plurality of recorded logic vectors and the plurality of inferred logic vectors; and compute power characteristics of each cell for each cycle based on a previous cell state during a previous cycle and a current cell state during a current cycle.

The non-transitory computer readable medium may further include stored instructions that when executed by the processor, cause the processor to generate the plurality of recorded logic vectors in a first thread, determine the plurality of inferred logic vectors in a second thread, and compute the per-cycle power characteristics in a third thread.

The non-transitory computer readable medium may further include stored instructions that when executed by the processor cause the processor to generate the plurality of recorded logic vectors in a first thread executed on a first processor of a first host, determine the plurality of inferred logic vectors in a second thread executed by a second processor of a second host, and compute the per-cycle power characteristics in a third thread executed on a third processor of a third host.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
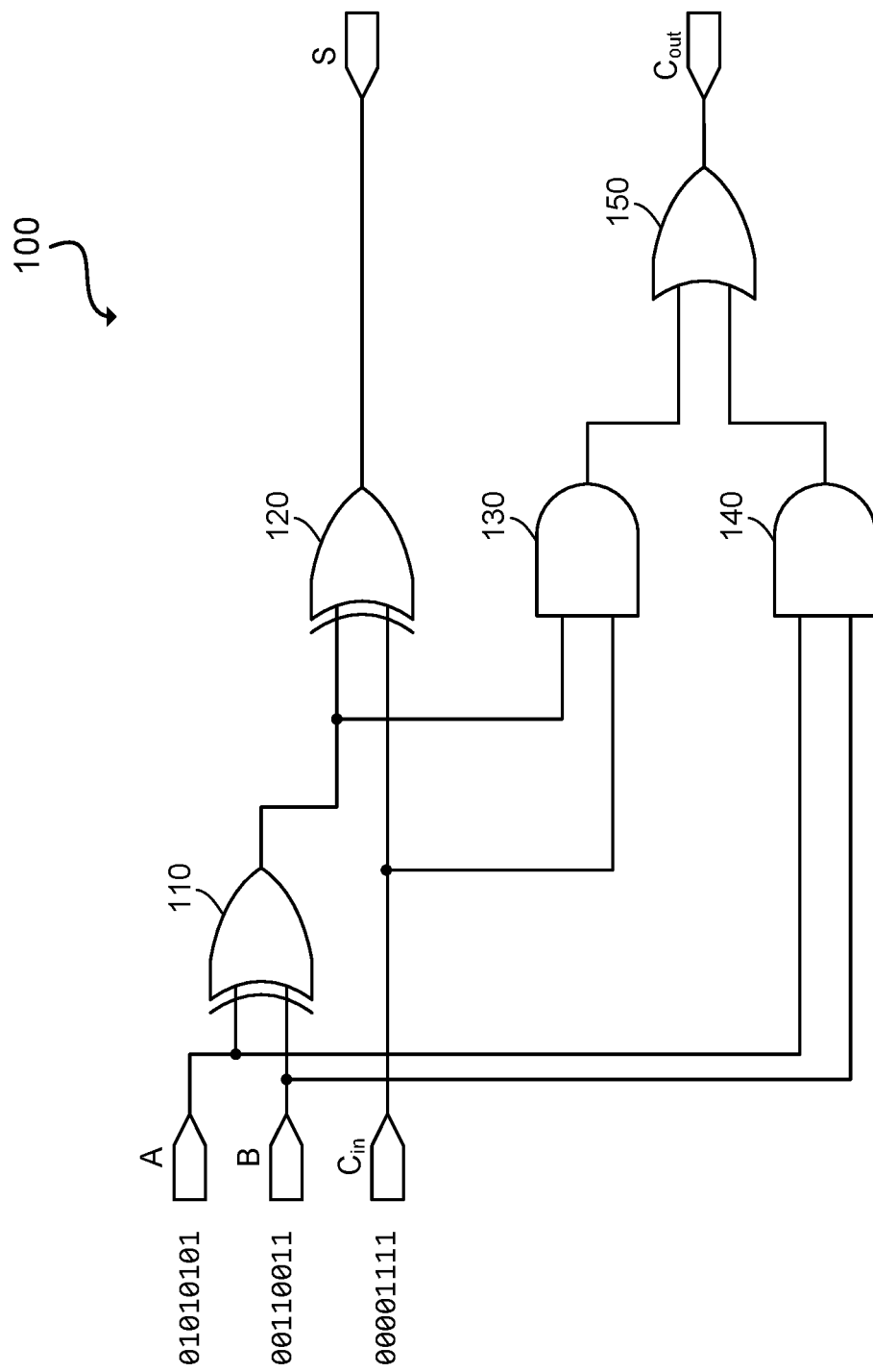
FIG. 1 is a block diagram of a full adder circuit as an example integrated circuit design for illustrating examples of embodiments of the present disclosure.

Aspects of the present disclosure relate to multi-cycle power analysis of integrated circuit designs.

In the context of electronic design automation (EDA) for designing integrated circuits (ICs) such as computer processors (CPUs), graphics processing units (GPUs), digital signal processors (DSPs), and the like, power analysis generally relates to estimating or predicting the electrical power consumption of a particular design of an integrated circuit. The estimated power consumption values may be used to evaluate a given integrated circuit design against specifications for that design. For example, integrated circuits (ICs) designed for use in portable electronic devices such as smartphones and laptop computers may have particular power design goals in regard to average, peak, and idle power consumption, at least because these power consumption values affect the battery life of portable electronic devices and may also influence the design of systems for thermal management of the ICs, such as heatsinks. As another example, integrated circuits designed for use in internet of things (IoT) devices may need to be able to operate with particularly low power consumption due to the small batteries and a target battery life in the range of months to years. As a further example, CPUs and GPUs designed for personal computers as well as for servers (e.g., in cloud computing environments) may also have constraints based on target power consumption levels of those hardware devices.

In general, a full integrated circuit design is generally made up of many sub-circuits, which may be made up of many standard cells (e.g., pre-designed circuits such as logic gates and buffers). The power consumption of these standard cells under different conditions, such as when maintaining a state or when inputs and/or outputs transition between different levels, is typically already characterized (e.g., through empirical measurements and/or mathematical modeling of the power consumption of the standard cell) and available from a design database.

The major components of power consumption are static power, which includes leakage current, and dynamic power, which includes switching power and short-circuit power. Dynamic power is power consumed by a circuit when it is active, such as when the circuit changes its output based on changes to its input. Static power (e.g., leakage current) is always consumed by a circuit while it is powered (e.g., even when its state remains unchanged), and the static power may be different depending on the state of the circuit (e.g., based on whether various inputs and outputs of the circuit are high or low).

Power analysis can be performed with gate level design and register transfer level (RTL) or gate level activities generated by a verification run or execution of the integrated circuit design, such as simulation or emulation of the activities of the integrated circuit design. Two approaches to power analysis include an average power analysis approach and a time-based or cycle-based approach.

Average power analysis estimates or predicts the power consumption of an integrated circuit design by lumping together the activities of various sub-circuits of the design using assumptions regarding typical toggle rates (e.g., rates at which a given sub-circuit switches between different states) to calculate dynamic power and assumptions regarding typical state probabilities (e.g., percentage of time the sub-circuit spends in different states). These toggle rates and state probabilities for various cells may be specified in a switching activity interchange format (SAIF). However, approaches based on average power analysis are often inaccurate, especially if the actual toggle rates and state probabilities do not match the assumptions, such as in the context of estimating power consumption during short time windows or while operating under particular conditions (e.g., particular operating states of the IC). In addition, these average power analysis approaches cannot generate precise power estimates on a time basis (e.g., during particular clock cycles of operation of the IC).

Cycle-based power analysis computes accurate estimates of power information on a per-cycle (per-clock-cycle) basis using value change information captured during a verification run or execution (e.g., simulation or emulation) of an integrated circuit design. During a verification run, input digital signals are supplied to various ports of the integrated circuit design, where those input signals (or input digital waveforms) change between different values (e.g., a logic low value and a logic high value, which may be represented as 0s and 1s), which causes various sub-circuits to output different values in response. For example, a sub-circuit configured to multiply two input numbers will compute, through the switching of the various cells within the sub-circuit, an output that represents the product of the two numbers. Changing the input arguments (input values) over time will generate different outputs in accordance with the function of the sub-circuit (e.g. multiplication).

In cycle-based power analysis, the input waveforms, the generated output waveforms and, in some cases, intermediate waveforms at selected locations within the integrated circuit design may be recorded during course of the simulation or emulation. These waveforms may be stored as value changes (VCs) that represent the time points at which a signal transitions between the different digital values (e.g., when the signal changes from 0 to 1 or vice versa). These value changes that were generated through simulation or emulation of the integrated circuit design may be stored in data formats such as, but not limited to, a fast signal database (FSDB) or a value change dump (VCD) file.

Generally, cycle-based power analysis includes: reading the signal VCs that were recorded during simulation or emulation; computing VCs at the cells throughout the integrated circuit design by propagating signals based on the recorded VCs; computing the power used by the cells during each clock cycle based on the propagated VCs at those cells; and outputting the per-clock-cycle and overall power information computed through the process. In addition, average power information can be computed from the per-clock-cycle information, such as by averaging values computed over various windows of time (e.g., over windows of clock cycles). While cycle-based power analysis is more accurate than average power analysis, it is much more computationally expensive in that it requires much more computer time, memory, and energy to estimate power consumption using cycle-based power analysis.

Some approaches to cycle-based power analysis include event-based analysis and signal-based analysis. In event-based analysis, each value change or VC (e.g., from 0 to 1 or from 1 to 0) is treated as an event that triggers signal propagation through the cells of the integrated circuit design and power usage computation at the cells. As signals are propagated, the outputs of various sub-circuits and/or cells in the integrated circuit design may also change, which further causes the outputs of other, downstream, cells or sub-circuits to change. In contrast, in signal-based analysis, the signal of all of the cycles are treated as one waveform and propagation and power usage computation are performed based on those signals. Event-based approaches tend to have the benefit of being able to flush cycle-accurate power information during the analysis process, but are not runtime efficient (e.g., are relatively slow), while signal-based approaches can be fast (if properly designed), but are limited in their ability to flush cycle-accurate power information during analysis (e.g., the computed power information is not available until the full analysis is complete).

Aspects of embodiments of the present disclosure relate to cycle-based power analysis that processes a window of multiple clock cycles of logic values in parallel (at the same time). For example, for each recorded signal of the circuit, multiple values of the signal during a window of multiple corresponding consecutive clock cycles (e.g., a window of 64 consecutive clock cycles) are bundled together into a logic vector, such as in a sequence or vector of multiple 0s and 1s representing the state of the signal during each clock cycle. For example, a first window may correspond to a range spanning from clock cycle 1 through clock cycle 64 of the verification run, and a second window may correspond to a range spanning from clock cycle 65 through clock cycle 128 of the verification run. Embodiments of the present disclosure simulate the operation of the circuit by providing these logic vectors (loaded from the signals recorded during previous simulations or emulations) as inputs to the cells to compute, in parallel, the outputs of those cells during every clock cycle of the window of clock cycles. These newly computed outputs may then be supplied (or propagated) as inputs to other cells, as consistent with the design of the integrated circuit, until all of the relevant inputs and outputs of the cells in the integrated circuit design have been computed, where the signal propagation steps computes output values corresponding to different clock cycles in parallel. In some embodiments, parallelism is achieved by packing the signal values of a logic vector (representing the logic values of a signal at multiple clock cycles) into a single data word having a bit width that is the same size as the bit width of the operands supplied as inputs to an arithmetic logic unit (ALU) of a core of the CPU executing the propagation of the inputs. For example, in the case of a 64-bit CPU having an ALU that performs arithmetic operations on operands (or arguments) having bit widths of 64 bits, a logic vector may include 64 bit values representing the logical values of a signal during 64 different clock cycles and the logic vector may be stored in a single data word with a bit width of 64 bits, such that the ALU performs operations on the representations of all 64 clock cycles in parallel using bitwise operations. In some embodiments, parallelism is achieved by packing the signal values of a logic vector into a same instruction multiple data (SIMD) register of a SIMD processor, a graphics processing unit (GPU), or a vector processor. For example, some current CPUs include SIMD registers or vector registers that store up to 512 bits of data. In this case, bitwise operations (bitwise scalar operations operating on word-sized operands in scalar registers or bitwise vector operations operating on vector registers or SIMD registers) implemented by an ALU of a processor core may be used to compute the outputs of cells based on given input logic vectors, where the input logic vectors have a size less than or equal to the bit widths of the operands supported by the ALU.

The inputs and outputs of the cells at each clock cycle are recorded as the states of those cells. These cell states are then used to compute or estimate the power information (e.g., power consumption) of the cells of the integrated circuit during each clock cycle, such as by computing the static power for the cell state and also the dynamic power if the cell was in a different state during the previous cycle. Furthermore, in some embodiments, the estimated power information computed for different cell states is stored or cached, such that, if the same state occurs during some other portion of the captured input and output signal waveforms or for another copy of the cell elsewhere in the IC design, the power information is retrieved from the cache, thereby avoiding the need to recompute the power information for that cell state.

Furthermore, some aspects relate to parallelizing and pipelining computation by pipelining the various stages of the computation (e.g., reading and parsing input data, propagating logic values through the design to compute signals, computing cell states from the propagated signals, and computing power characteristics at each cell state) across multiple threads executed by multiple cores of the same CPU, multiple CPUs in the same host device (e.g., computer), and/or multiple hosts (e.g., across multiple computers).

This further allows power characteristics computed for completed windows of clock cycles (e.g., a window corresponding to clock cycles 1 to 64) to be output or flushed while the processor is still computing power characteristics (e.g., in other threads) for other windows of signals (e.g., a window corresponding to clock cycles 65 to 128). Flushing of the computed power characteristics of the design for windows of cycles as they are computed shortens the feedback cycle for providing users (engineers), such that users do not need to wait for the computation of power characteristics for the entire period of the verification run to be completed before seeing any results (as occurs with some typical cycle-based power analysis techniques).

As such, embodiments of the present disclosure provide the same (or better) accuracy as other approaches to cycle-based power analysis, but with substantially reduced runtime (e.g., embodiments of the present disclosure complete the analysis for similar integrated circuit designs in much less time) and with less latency before showing partial results of the power analysis (e.g., due to flushing of results as windows of cycles are analyzed). Aspects of embodiments of the disclosure reduce energy consumption and overall time taken by the computer systems used to perform the analysis, thereby allowing integrated circuit designers to develop better designs within their design schedules and with less energy used by the computer systems each time a power analysis is performed.

FIG. 1 is a block diagram of a full adder circuit as an example integrated circuit design for illustrating examples of embodiments of the present disclosure. As shown in FIG. 1, a full adder circuit 100 computes the sum of three single-bit input signals, labeled A, B, and C where these input signals correspond to a first operand (A), a second operand (B), and a third operand which may be referred to as a carry-in bit ($C_{in}$). A full adder circuit 100 includes a first XOR gate 110, a second XOR gate 120, a first AND gate 130, a second AND gate 140, and an OR gate 150, where the output of the second XOR gate 120 is referred to as the sum signal (S) and the output of the OR gate 150 is referred to as the carry-out signal ($C_{out}$). When implementing a multi-bit adder out of multiple full adders, the carry-out signal ($C_{out}$) of each adder is supplied as the carry-in ($C_{in}$) input to the full adder for computing the next most significant bit of the sum.

During the course of simulation or emulation, various essential or non-inferable signals may be recorded and stored (e.g., primary inputs, sequential cell outputs, and black box outputs). In this example, the input waveforms supplied to inputs A, B, and C may be essential or non-inferable signals because these are the primary inputs to the full adder circuit 100. FIG. 1 shows eight cycles of logic states for each of the signals, where the first input signal representing the first operand A during eight clock cycles is 01010101, the second input signal representing the second operand B during the eight clock cycles 00110011, and the third input signal representing the carry-in signal during the eight clock cycles is 00001111. These binary representations of the logic states of the signals during a plurality of cycles (in this example, eight clock cycles) may be referred to herein as logic vectors.

For the sake of reference, the output sum S is 01101001 and the carry out is 00010111, but these signals are not necessarily included among the essential or non-inferable signals, at least because these output signals can be computed by propagating the primary input signals through the circuit, as described in more detail below.

The input signals are supplied to various cells within the circuit. In particular, in the full adder circuit 100, the first input A and the second input B are supplied directly to the first XOR gate 110 and the second AND gate 140, and the third input $C_{in}$ is supplied as input to the second XOR gate 120 and the first AND gate 130. As various signals are supplied to cells within the design during each clock cycle, the states of the cell may change or remain the same, depending on whether the inputs to that cell have changed. As a result, each cell may have different power characteristics (e.g., static power consumption and dynamic power consumption) for each clock cycle. The inputs and outputs to a cell in the circuit during a single clock cycle will be referred to as its state or cell state.

Therefore, estimating the power characteristics of a circuit design, such as the full adder circuit 100, using a cycle-based approach includes computing the states of the cells of the design across the input waveforms by propagating the input values through the cells of the circuit design and estimating the power characteristics of each cell during each cycle based on those computed cell states.

Figure 2:
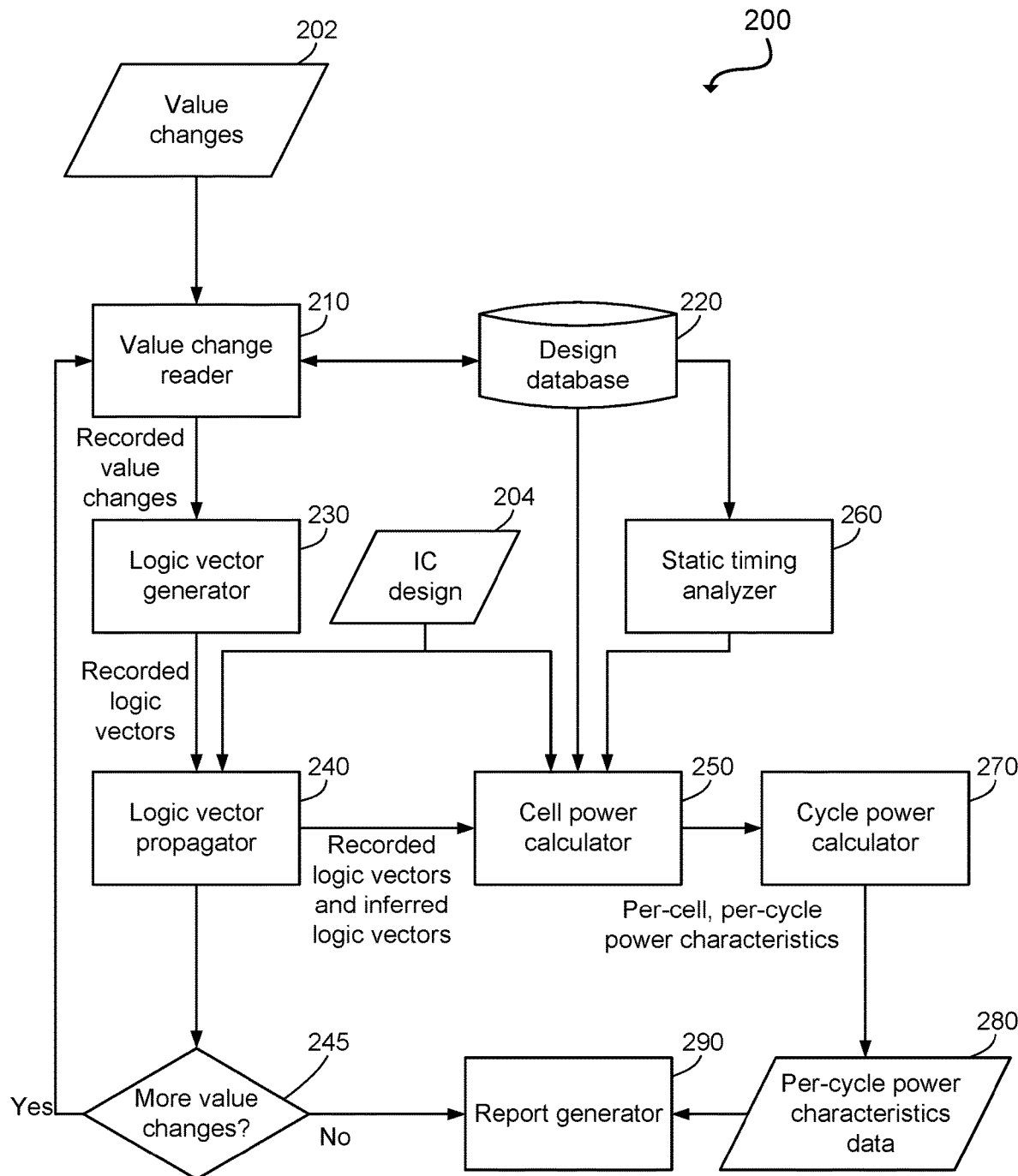
FIG. 2 depicts a flowchart of multi-cycle power analysis according to one embodiment of the present disclosure.

FIG. 2 depicts a flowchart of stages of multi-cycle power analysis 200 according to one embodiment of the present disclosure. Value change data 202 including value changes are supplied as input to a multi-cycle power analysis. These value changes may be generated during a verification run (e.g., through simulation or emulation) of an IC design, such as by recording value changes of non-inferable (or essential or non-combinational) signals during the simulation or emulation process. Examples of non-inferable (or essential or non-combinational) signals include primary inputs (e.g., inputs provided directly to the sub-circuit under test in the simulation or emulation, such as from a test bench), sequential cell outputs (e.g., cells that include memory and whose outputs depend on earlier inputs), and black box outputs (e.g., cells having behavior that cannot be explicitly or easily modeled, due to being secret, non-deterministic, and/or too complex to simulate efficiently, such as sub-circuits configured to implement encryption or pseudorandom number generation). As used herein, the term recorded signal will refer to signals that were recorded from verification runs (e.g., simulation or emulation), where the recorded signals may include non-inferable signals that cannot be inferred from other signals or that would be too complicated or difficult to infer efficiently (e.g., impossible or computationally expensive to infer using purely combinational logic) by a processor executing a logic vector propagator 240.

The value changes of the value change data 202 may be expressed as a collection of logic value changes for each signal during specified cycle times or timestamps of the simulation or emulation (e.g., as a tuple including a timestamp, a logic value change, and a signal identifier). A logic value change of '0' or '1' for a particular signal identifier at a particular timestamp indicates that the signal identified by the signal identifier underwent a change to the specified logic value change at that timestamp. When a signal does not change during a particular timestamp or clock cycle, then there is no corresponding value change for that timestamp (likewise, the lack of a value change for a signal for a timestamp indicates that the signal did not change at that timestamp). As such, the values changes may be referred to as being optional, in the sense that the value changes are present when there is a change and the value changes are absent when there is no change. Table 1, below, presents an example of value changes for five signals-labeled net1, net2, net3, net4, and net5—at four different timestamps-5 nanoseconds (ns), 6 ns, 7 ns, and 8 ns-after the start of the simulation. In this particular example, because there is one clock cycle per nanosecond, the clock rate is 1 gigahertz (GHz). However, embodiments are not limited thereto and may apply to other integrated circuits having different clock rates, in which case the timestamp of each value change are not necessarily integral numbers of nanoseconds.

TABLE 1

| Time (ns) | net1 | net2 | net3 | net4 | net5 |
|---|---|---|---|---|---|
| 5 | 0 | 1 | 1 | 0 | 0 |
| 6 | 1 |   | 0 |   | 1 |
| 7 | 0 | 0 |   |   |   |
| 8 |   |   | 1 | 1 | 0 |

According to some embodiments, a processor executing instructions implements a value change reader 210. For example, a computer readable medium stores instructions that, when executed by a processor, implements value change readers 210 according to various embodiments.

Value changes (VCs) recorded or dumped out during the simulation or emulation of a given IC design may be stored in a fast signal database (FSDB), a value change dump (VCD) file, or other similar formats. These value change formats generally include a header part that describes associations between the signals from simulation or emulation and objects (e.g., particular signals) in the design. The value change formats also include VCs that are typically listed in order of simulation time or listed by signals.

A VC is typically a triplet of time (or timestamp), signal identifier (ID), and logic value change (or logic value) that maps to a logic state on a net or pin in the IC design at a specified time. For RTL or zero delay FSDB, VCD or similar formats, VCs only occur on discrete cycle time points based on the clock rate (e.g., at the beginning of each clock cycle).

The value change reader 210 reads the recorded value changes from a storage medium (e.g., a mass storage device such as a hard drive, a solid state drive, or network addressed storage) into memory and may also parse the value changes into a data structure in memory (e.g., a dictionary or other key-value data structure mapping signal names to value changes for each timestamp) to update the activities (e.g., the signals within the design) and cell states of the parts of the design that are included among the stored value changes.

Some aspects of embodiments of the present disclosure relate to using the recorded VCs to generate recorded logic vectors that bundle together recorded logic values on nets and/or pins in the design for a window of consecutive cycle time points. A logic vector corresponds to one signal (e.g., net and/or pin) within the design, and each bit in the logic vector represents the logic value of the signal at a certain cycle time within the window. Logic vectors that are generated directly from recorded value changes may be referred to herein as recorded logic vectors, in contrast to inferred logic vectors computed from the recorded logic vectors by propagation of logic vectors through the integrated circuit design, as described in more detail below.

A processor executing instructions in some embodiments implements a logic vector generator 230, which is configured to generate logic vectors based on the value changes read by the value change reader. For example, a computer readable medium stores instructions that, when executed by a processor, implements logic vector generators 230 according to various embodiments. As noted above, the value changes may only include values for clock cycles in which the value of a signal (e.g., net1 through net5 in Table 1) has changed over a window of clock cycles. In contrast, a logic vector for a given signal represents the value of the clock signal during every clock cycle of the clock window.

Table 2 below is an example of five logic vectors generated from the value changes shown in Table 1 for the window of timestamps (or clock cycles) from 5 to 8 ns after the start of a simulation or emulation. In particular, for each signal (e.g., net1 through net5), the processor implementing a logic vector generator generates a logic value for each cycle of the window of cycles represented by the logic vectors, where the logic value is generated based on the value of a corresponding value change at the timestamp, if such a value change exists, or based on the value of the logic vector at the previous timestamp, if such a value change does not exist in the value changes for the current timestamp. The labels of the columns and rows of Table 2 are transposed with respect to those of Table 1 to indicate the change from a time centric-view of the data in Table 1 (where every data point is a collection of signal change events that occur at a timepoint) to a signal-centric view in Table 2 (where every data point is a collection of logic values for a single signal across multiple timepoints). In Table 2, the timestamps are organized from 8 ns to 5 ns such that lower order bits (or less significant bits or LSBs of the logic vector) correspond to the logic values at earlier timestamps and higher order bits (or more significant bits or MSBs of the logic vector) refer to the logic values at later timestamps.

Accordingly, each row of Table 2 depicts a logic vector over the four-cycle window from 5 ns to 8 ns for different signals shown in Table 1. The logic vector for signal net1 is 0b0010, the logic vector for the signal net2 is 0b0011, the logic vector for the signal net3 is 0b 1000, the logic vector for the signal net4 is 0b1001, and the logic vector for the signal net5 is 0b0110. As shown in the last column of Table 2, each of these logic vectors of binary values can be interpreted as an integer. For example, the logic vector for net2 of 0b0011 is equal to the decimal value 3.

According to some embodiments, the size of the window of the logic vectors is set to a value less than or equal to the data word size (or bit width) of the processor (e.g., the size of an operand supplied to an ALU of a processor core) configured to implement a logic vector propagator 240 (described in more detail below) according to various aspects. For example, in a case where the logic vector propagator 240 is implemented on a 64-bit processor (e.g., having 64-bit registers and having scalar instructions that control an ALU to operate on 64-bit data words-data words having a bit width of 64 bits), then the size of the window may be less than or equal to 64 cycles. Likewise, in a case where the logic vector propagator 240 is implemented on a 32-bit processor (e.g., having 32-bit registers and having scalar instructions that control an ALU to operate on 32-bit data words-data words having a bit width of 32 bits), then the size of the window may be less than or equal to 32 cycles. As such, a logic vector may be equivalently expressed as an unsigned integer in accordance with the native bit width of the processor (e.g., a 64-bit integer in the case of a 64-bit processor).

According to some embodiments, the logic vector propagator 240 is implemented on a SIMD (same instruction, multiple data) processor or a vector processor (e.g., having vector registers and having vector instructions that operate on multiple data words in parallel) such as a CPU supporting SIMD instructions or a GPU, in which case the size of the window of clock cycles represented by a logic vector may be less than or equal to the bit width of the vector registers (e.g., 512 bits in the case of an x86 SIMD processor supporting Intel® AVX-512 (Advanced Vector Extensions)).

For the sake of conciseness, aspects of embodiments will be described in more detail below for the case where the logic vectors are packed into scalar data words, such as the case of windows of up to 64 cycles of logic values that are packed into the 64 bits of a data word (e.g., unsigned integer) of a 64-bit processor.

TABLE 2

| Signal | 8 ns | 7 ns | 6 ns | 5 ns | Logic vector as integer |
|---|---|---|---|---|---|
| net1 | 0 | 0 | 1 | 0 | 2 |
| net2 | 0 | 0 | 1 | 1 | 3 |
| net3 | 1 | 0 | 0 | 0 | 8 |
| net4 | 1 | 0 | 0 | 1 | 9 |
| net5 | 0 | 1 | 1 | 0 | 6 |

Figure 3A:
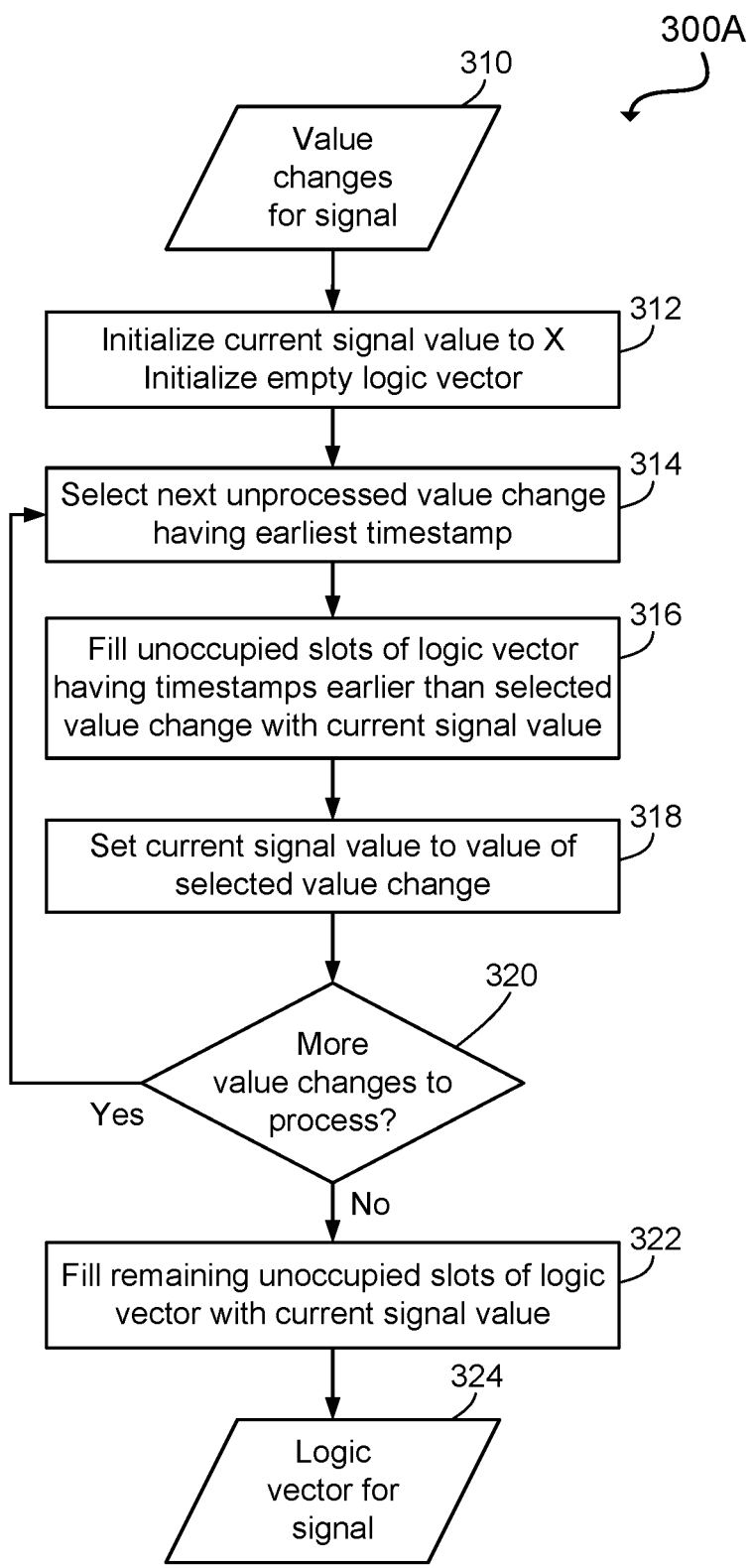
FIG. 3A is a flowchart depicting a method for generating a logic vector for a signal based on value changes associated with the signal according to one embodiment of the present disclosure.

FIG. 3A is a flowchart depicting a method 300A for generating a logic vector for a signal based on value changes associated with the signal according to one embodiment of the present disclosure. In the approach of FIG. 3A, the logic vector generator 230 iterates over the value changes for a single signal to generate the logic vector for the signal. In the example of FIG. 3A, the input to the method 300A is a set of value changes 310 for one signal. For the sake of illustration, the value changes for net2 will be considered here, where those changes are: 5 ns: 1 and 7 ns: 0. At 312, the logic vector generator 230, implemented by a processor executing instructions, initializes a current signal value to X (for unknown) and initializes an empty logic vector (e.g., having a length equal to the size, in cycles, of the logic vector window) indexed based on the timestamps of the range of the window. In this example, the logic vector will have a length of 4 to span the cycles with timestamps 5 ns, 6 ns, 7 ns, and 8 ns.

At 314, the logic vector generator 230 selects a next unprocessed value change from the value changes 310 having an earliest timestamp. In this example, net2 has two associated value changes having timestamps 5 ns and 7 ns. Because 5 ns has the earliest timestamp among the unprocessed value changes, the logic vector generator 230 selects the value change at 5 ns.

At 316, the logic vector generator 230 fills unoccupied slots of the logic vector having timestamps earlier than the currently selected value change. In this case, because the logic vector is indexed from 5 to 8, there are no unoccupied slots with timestamps earlier than the timestamp of the selected value change of 5 ns. At 318, the logic vector generator 230 sets the current signal value to the value of the selected value change. In this example, the value change of net2 at 5 ns is 1 and therefore the current signal value is set to 1.

At 320, the logic vector generator 230 determines if there are move value changes to process. If so, then it returns to 314 to select a next unprocessed value change having an earliest timestamp. In this iteration, the value change with the timestamp of 5 ns has already been processed and therefore the next value change having earliest timestamp of 7 ns is selected.

For example, at 316, the logic vector generator 230 fills the unoccupied slots of the logic vector having timestamps earlier than the selected value change of 7 ns with the current signal value (which was set to 1 during the previous iteration). Continuing this example, unoccupied slots at 5 ns and 6 ns are set to the current signal value of 1 (thereby setting the logic vector to 0b11). At 318, the logic vector generator 230 sets the current signal value to the value of the selected value change, in this case 0 because the current value change is 7 ns: 0.

At 320, the logic vector generator 230 determines that there are no more value changes to process (because the two value changes at 5 ns and 7 ns have now both been processed) and proceeds to 322, where it fills the remaining unoccupied slots of the logic vector with the current signal value (e.g., which was set to 0 at 318 during the last iteration of the loop). This sets the logic vector to 0b0011, which is the final logic vector for the signal at 324, and which matches the corresponding row of Table 2.

Figure 3B:
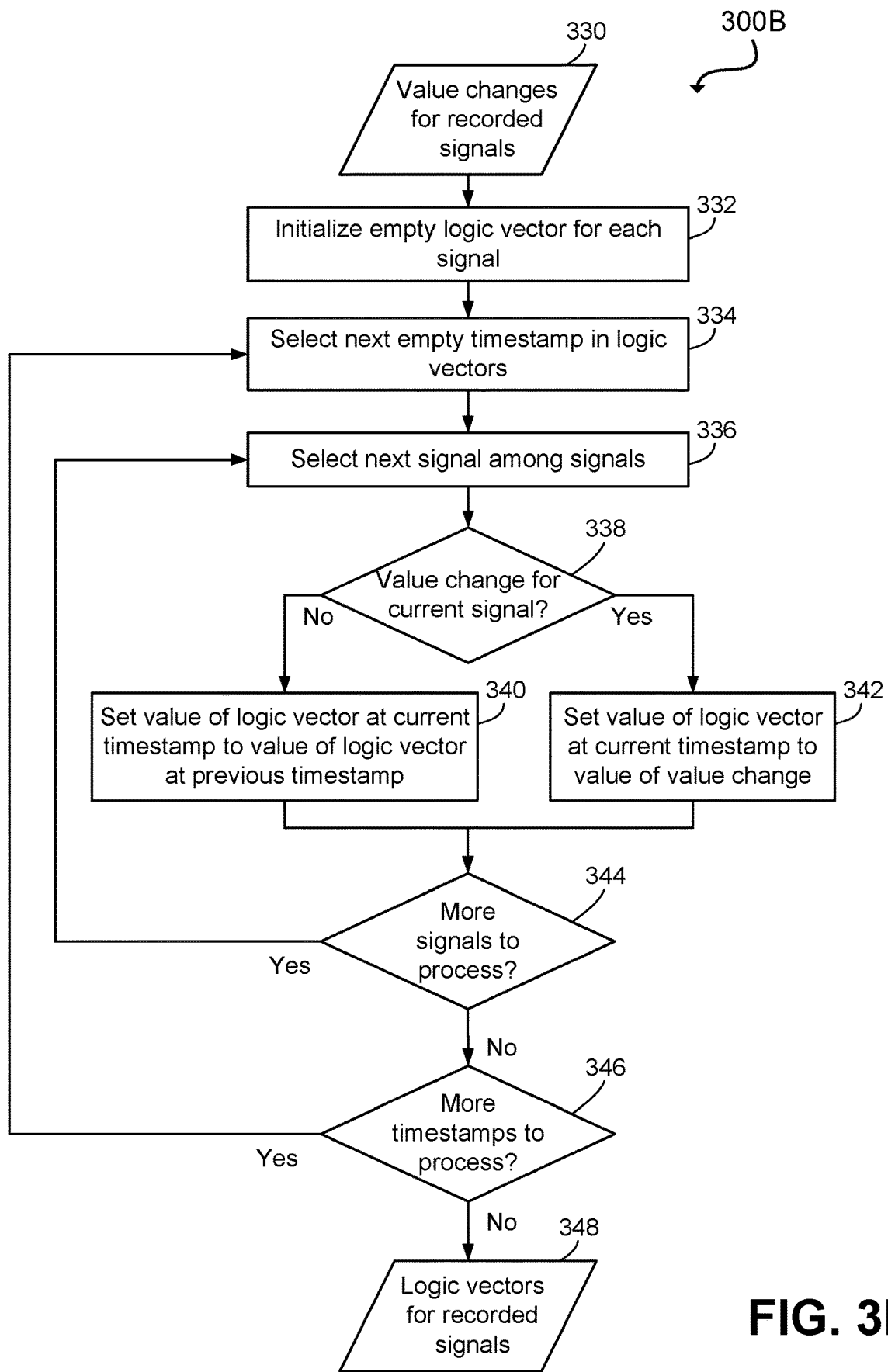
FIG. 3B is a flowchart depicting a method for generating logic vectors for multiple signals based on value changes associated with the signals according to one embodiment of the present disclosure.

FIG. 3B is a flowchart depicting a method 300B for generating logic vectors for multiple signals based on value changes associated with the signals according to one embodiment of the present disclosure. In the approach of FIG. 3B, the logic vector generator 230 iterates over the timestamps of the window of cycles for the logic vectors of the signals to generate the logic vector for multiple signals.

The input to the method 300B of FIG. 3B includes value changes for multiple signals 330, such as all of the value changes shown in Table 1.

At 332, the logic vector generator 230 initializes an empty logic vector for each signal (e.g., signals net1, net2, net3, net4, and net5), and at 334 begins to iterate over the timestamps associated with the slots in the logic vectors by selecting a next empty timestamp or selecting a current timestamp (e.g., the first timestamp of 5 ns).

The logic vector generator 230 then computes the logic values for each of the signals at the currently selected timestamp, by selecting a signal to process among the signals at 336, then determining, at 338, if there is a value change for the selected signal at the selected timestamp. In the case where there is no value change for the selected signal at the selected timestamp, at 340 the logic vector generator 230 sets the value of the logic vector at the current timestamp to the value of the logic vector at the previous timestamp (in the case where there is no previous timestamp, such as the first cycle and there is no value change at the first cycle, then the logic value may be set at X for unknown or some other default value). In the case where there is a value change for the current signal, at 342 the logic vector generator 230 sets the value of the logic vector at the current timestamp based on the value of the value change. At 344, the logic vector generator 230 determines whether there are more signals to process (e.g., additional signals for which it has not yet computed a logic value for the selected timestamp). If so, then it returns to 336 to select a next signal among the remaining signals.

In the example shown in FIG. 3B, the logic vector generator 230 by iterates over the signals to compute the logic values for the current timestamp, where the iteration is controlled by selecting a next signal at 336 and determining if there are more signals to process at 344. However, embodiments of the present disclosure are not limited thereto, and logic vector generator 230 may compute the logic value of each signal at the current timestamp in other ways (e.g., by computing some or all of the values of different signals in parallel or by mapping a function onto all of the signals).

After logic values are generated for the logic vectors of all of the signals for the current timestamp, the logic vector generator 230 determines, at 346, whether there are more timestamps to process. If so, then it proceeds to select a next timestamp at 334 and continues, as described above, to compute logic values for the logic vectors. After computing all of the logic values of the logic vectors, the logic vector generator 230 returns the generated logic vectors for the signals at 348 (e.g., the values shown in Table 2, above).

While FIG. 3A and FIG. 3B provide two example methods for generating logic vectors from value changes, embodiments of the present disclosure are not limited thereto and other methods may be applied by the logic vector generator 230 to generate logic vectors from value changes.

Referring to FIG. 2, the logic vectors generated by the logic vector generator 230 from the value changes 202 are supplied to a logic vector propagator 240. In various embodiments, the logic vector propagator is implemented by a processor executing instructions. For example, a computer readable medium stores instructions that, when executed by a processor, implements logic value propagators 240 according to various embodiments. The logic vector propagator 240 propagates the logic vectors through the integrated circuit (IC) design 204, to compute or reconstruct or infer the signals at inputs and outputs of the cells (e.g., logic gates, buffers, registers, and the like) of the IC design, thereby computing inferred logic vectors corresponding to inferred logic values over a window of consecutive cycles (clock cycles). The inputs and outputs of a cell during a single clock cycle will be referred to herein as the state of the cell during that clock cycle. As such, given a set of logic vectors representing recorded logic values of recorded signals (e.g., including non-inferable or non-combinational signals), the logic vector propagator 240 propagates the recorded signals through the IC design to reconstruct the inferable signals (e.g., logic values) that are transmitted between output and input pins of cells in the design as represented by the logic vectors, and computes the states of the cells (inputs and outputs of the cells) based on the recorded logic vectors and the inferred logic vectors (or propagated or reconstructed logic vectors).

Figure 4A:
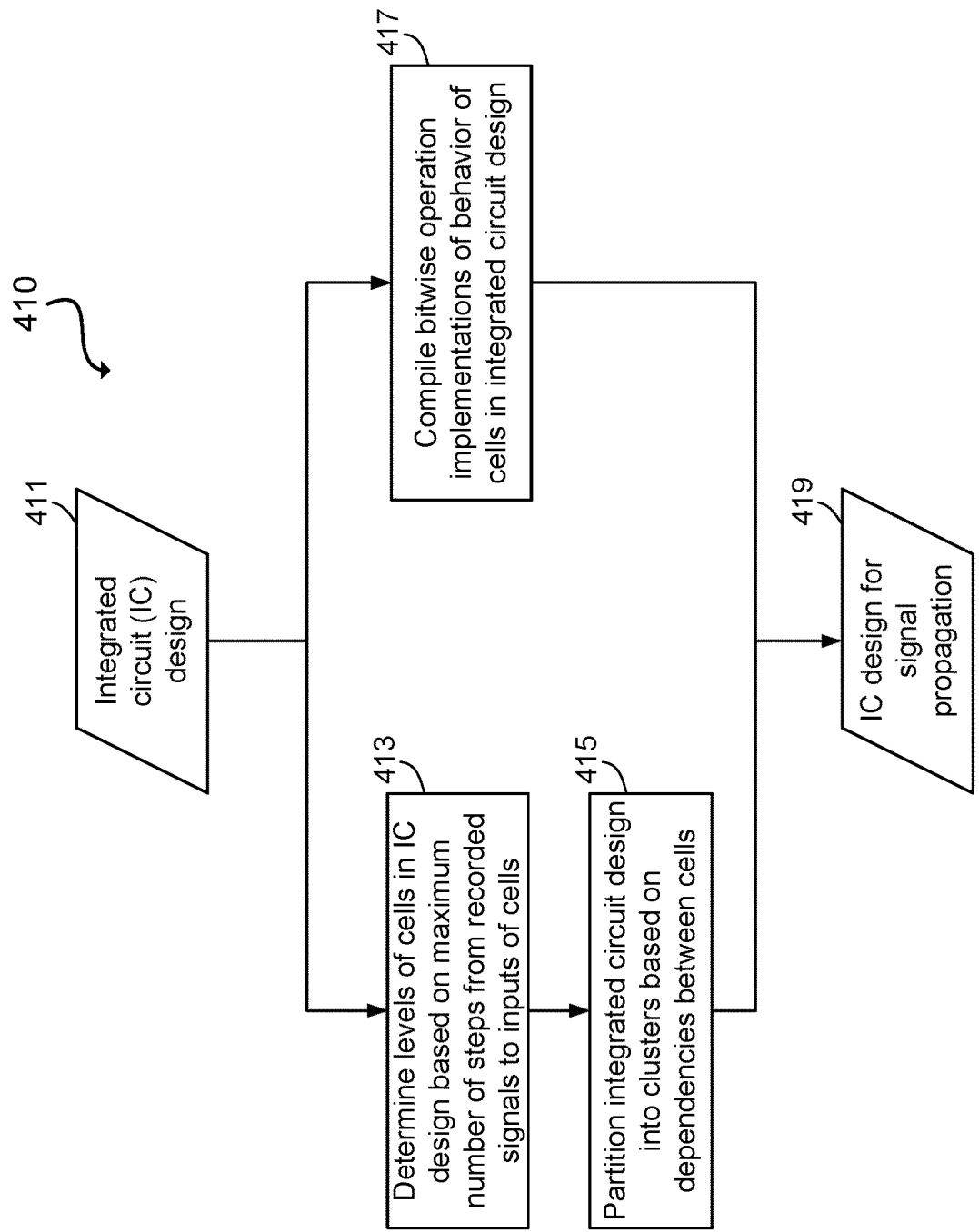
FIG. 4A is a flowchart depicting a method for generating a representation of the IC design for propagating logic vectors through a cell according to one embodiment of the present disclosure.

FIG. 4A is a flowchart depicting a method for generating a representation of the IC design for propagating logic vectors through a cell according to one embodiment of the present disclosure. A processor executing instructions receives an input integrated circuit (IC) design 411 (e.g., IC design 204 shown in FIG. 2) to generate a representation of the IC design to be used for propagating logic vectors. At 413, the processor determines levels of the cells in the IC design based on the maximum number of steps or stages between a recorded input signal and an input to the cell.

Figure 4B:
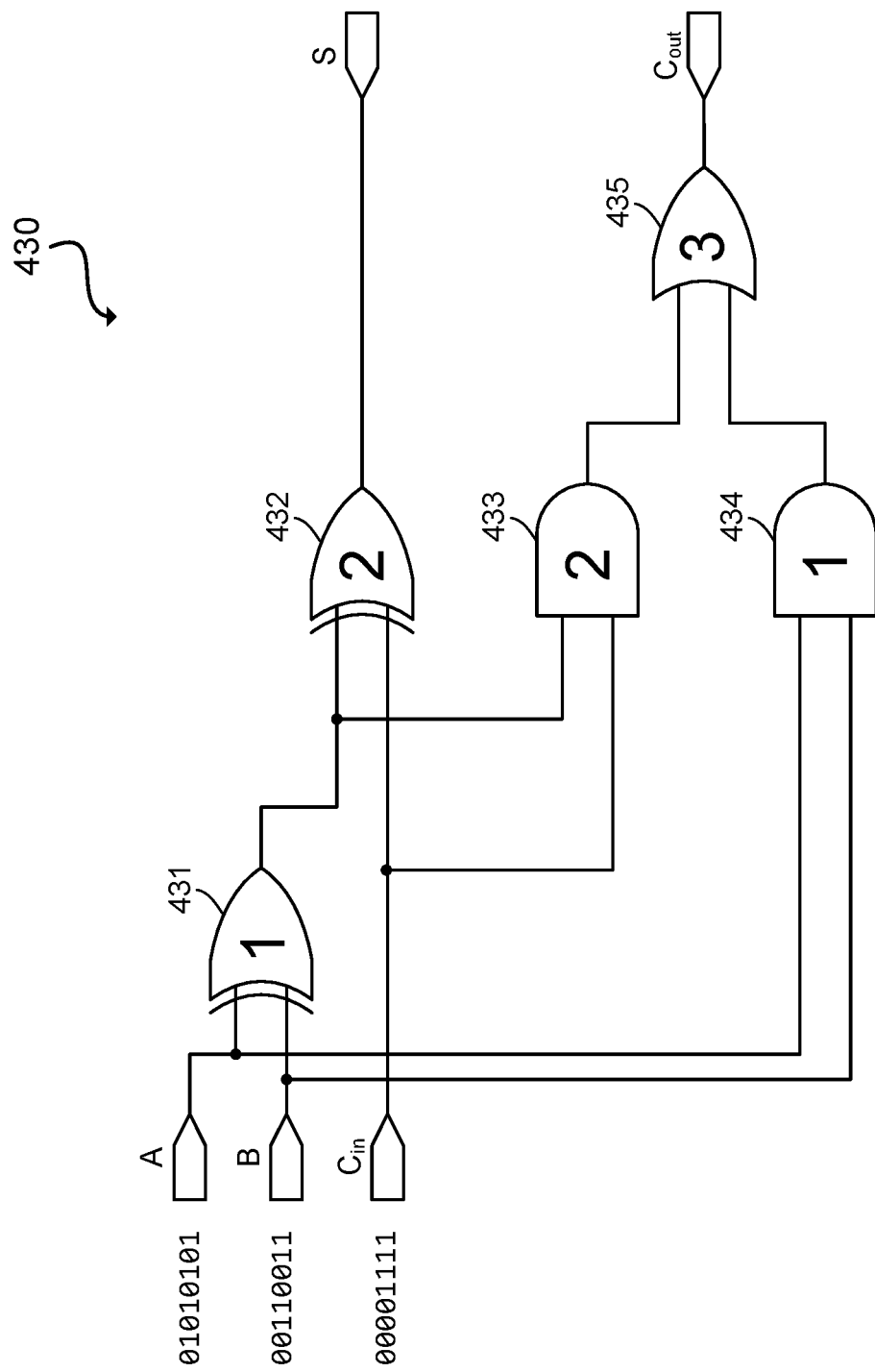
FIG. 4B depicts labeling cells based on their level within the example integrated circuit design of FIG. 1.

FIG. 4B depicts labeling cells based on their level within the example integrated circuit design 430 of FIG. 1 (e.g., as specified by a netlist). In the particular example shown in FIG. 4B, there are three recorded inputs: first input signal A, second input signal B, and third input signal $C_{in}$. Both inputs to first XOR gate 431 are directly connected to the first input signal A and the second input signal B, and therefore the first XOR gate 431 is assigned a level of 1. Likewise, both inputs of second AND gate 434 are also connected directly to the first input signal A and the second input signal B, and therefore the second AND gate 434 is also assigned a level of 1.

While the second XOR gate 432 and the first AND gate 433 each has one input connected directly to the third input signal $C_{in}$, both of these gates also have an input that is supplied from the output of the first XOR gate 431. Therefore, in both cases the maximum number of steps between an input to a recorded input is 2, because the output of the first XOR gate 431 must be determined before the processor is able to compute the output of the second XOR gate 432 and the output of the first AND gate 433.

Similarly, OR gate 435 has two inputs, one of which depends on a cell with a level of 2 (the first AND gate 433) and the other of which depends on a cell with a level of 1 (the second AND gate 434). Therefore, the OR gate 435 is assigned a level of 3 because its output depend on an input with a maximum level of 2.

At 415, the processor partitions the integrated circuit design into clusters, where the clusters are independent of each other for logic propagation (e.g., there are no inter-cluster dependencies where a cell of one cluster depends on the output of another cluster). In some embodiments, the processor is configured to automatically determine a cluster by identifying a plurality of cells where the inputs to each cell come from other cells within the cluster or from cells (or driven by external inputs) having a lower level than the lowest level cell of the cluster. For example, in some embodiments, an initial cell is added to a new cluster and all immediately downstream cells that receive inputs directly from the selected cell are added to the cluster, along with all cells that supply inputs to those cells that were immediately downstream from the selected cell (apart from cells that are already part of another cluster). Cells (e.g., cells that are immediately downstream of cells that are in the cluster) and their dependencies (e.g., cells that produce the inputs to added cells that are not yet part of a cluster) are then incrementally added to the cluster. In some embodiments, cells are added to a cluster until the processor reaches an annotated pin or net (e.g., annotated to indicate a boundary of the cluster), a sequential cell clock pin, or unannotated sequential or blackbox outputs. In some embodiments, the process continues until a target cluster size is reached (e.g., so long as a satisfactory cluster is smaller than a maximum cluster size), where the target cluster size or maximum cluster size is set based on, for example, the memory available in the computer system for performing the cycle-based power analysis, where performance is improved when a cluster can be stored, in its entirety, in memory without resorting to virtual memory (e.g., storing portions of the cluster to a solid state drive or hard disk drive). In each cluster, the cells and nets are levelized and the loops are broken, such as by performing a breadth first traversal of a netlist describing the integrated circuit design, where the traversal stops upon reaching a previously visited cell.

At 417, the processor compiles bitwise operation implementations of the behaviors of the cells in the integrated circuit design. The behavior of a cell is implemented as logic function mapping inputs to the cell to outputs of the cell (e.g., where the outputs of the cell are computed solely based on current inputs to the cell, where the logic function does not depend on stored internal state that is not part of the current inputs). In circumstances where a cell of the integrated circuit design is a non-combinational cell such as sequential cell, some inputs or outputs of the cell may be included among the recorded signals (e.g., the recorded value changes annotated from FSDB) that were recorded during a verification run of the integrated circuit design, and therefore there is no need to propagate the logic vectors through such cells (because their outputs are among the recorded signals). For simple logic functions, such as AND, OR, NAND, NOR, INV, and the like, their evaluations can be achieved with one or more bitwise operations on integers (e.g., native processor instructions for bitwise operations). Accordingly, the behavior of simple logic gates can be performed for multiple cycles in parallel very quickly (e.g., in a single clock cycle of the processor performing the propagation). For cells having more complex functionality, logic evaluations are realized by combining multiple bitwise operations or by imitating the operations of a cell in a compiled function (e.g., a collection of machine code instructions such as in an x86 instruction set or ARM® NEON® instruction set) written in a higher level language (e.g., a C function written to perform the same computation as the cell).

Figure 4C:
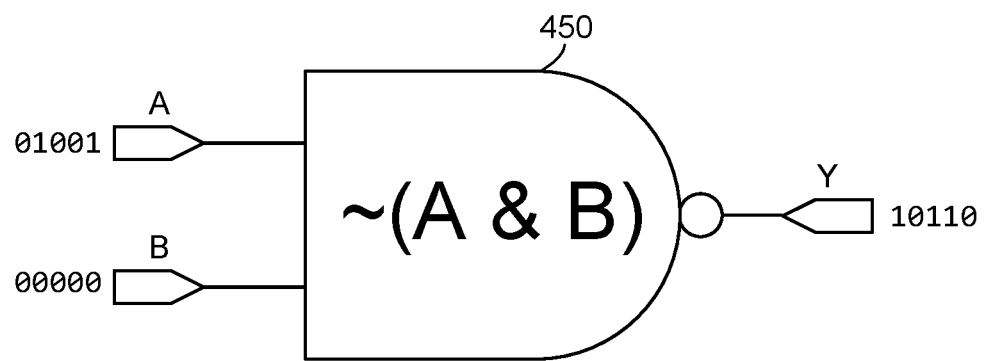
FIG. 4C illustrates multi-cycle propagation of logic vectors through a cell of an integrated circuit design and computing per-cycle power consumption of the cell according to one embodiment of the present disclosure.

FIG. 4C illustrates multi-cycle propagation of logic vectors through a cell of an integrated circuit design and computing per-cycle power consumption of the cell according to one embodiment of the present disclosure.

During propagation of a logic vector, pin A and pin B of the NAND2 gate 450 have the logic values of a logic vector (a window of, for example, 64 cycles) derived from VCs from simulation or emulation or propagated from other cells (upstream cells) in the integrated circuit design. The logic values on output pin Y over the entire time window of the logic vector are efficiently evaluated with a concurrent logic evaluation method by applying bitwise operators to the logic vectors (e.g., as indicated by the implementation of NAND as the bitwise complement (~) of the bitwise AND (&) of the input logic vectors A and B.

Figure 4D:
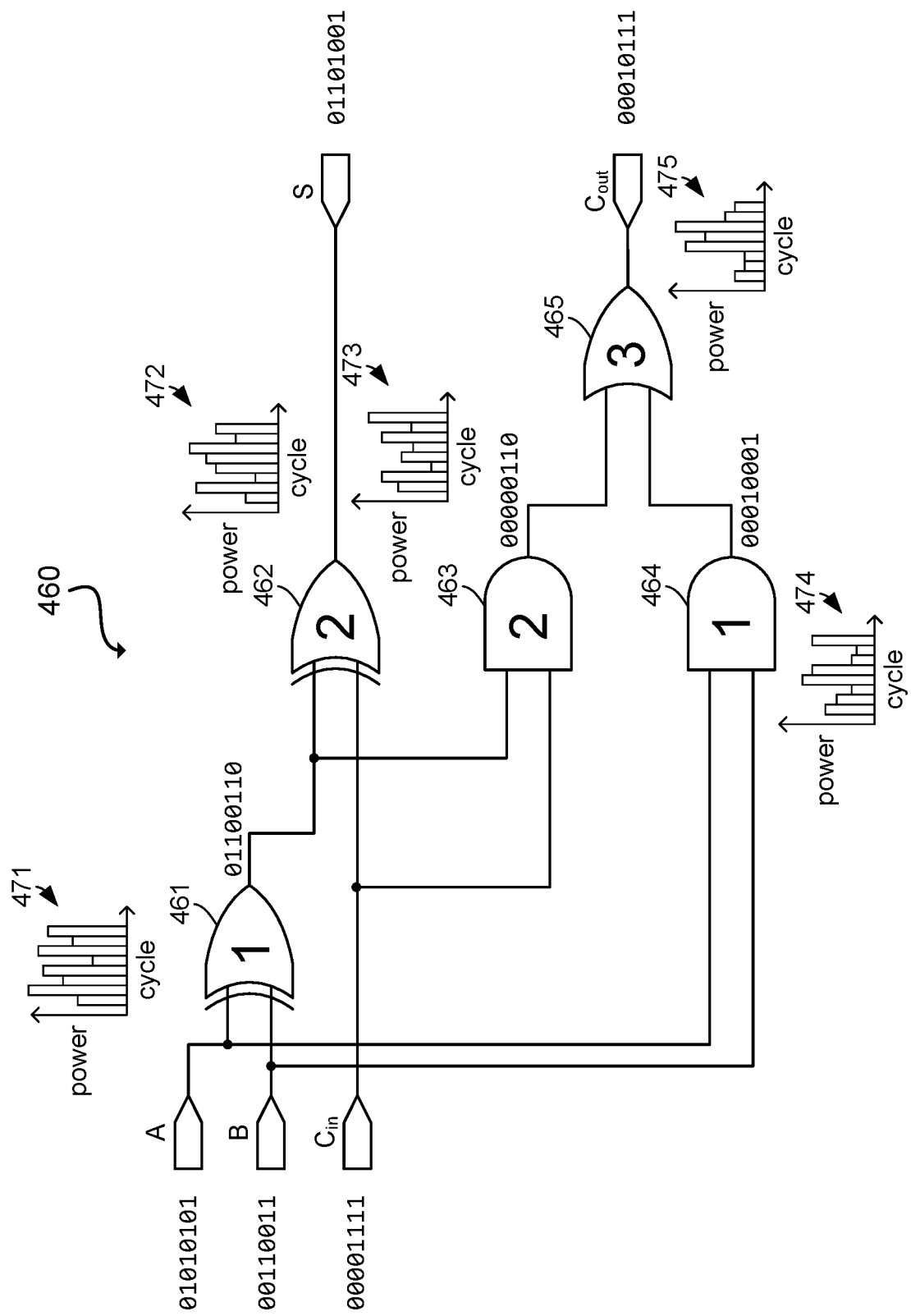
FIG. 4D illustrates the result of multi-cycle propagation of logic vectors, according to one embodiment of the present disclosure, through the example circuit design shown in FIG. 1 and per-cycle power characteristics of cells of the design computed according to one embodiment of the present disclosure.

FIG. 4D illustrates the result of multi-cycle propagation of logic vectors, according to one embodiment of the present disclosure, through the example circuit design shown in FIG. 1 and per-cycle power characteristics of cells of the design computed according to one embodiment of the present disclosure. In some embodiments, a queue is used to maintain the order of cells to be propagated so that the logic vectors of all inputs are ready (e.g., already computed) when the cell is evaluated to compute its output. The numbers on each gate are their levels, as assigned at 413. The cells are processed in the order of their levels (e.g., placed in the queue based on their level). In this case, the queue may have the gates of the design 460 in the order: two first level gates—first XOR gate 461 and second AND gate 464; two second level gates—first AND gate 463 and second XOR gate 462; and one third level gate-OR gate 465.

The representation of the IC design for signal propagation and the logic vectors are supplied to the logic vector propagator 240 as implemented by a processor executing instructions. The logic vector propagator 240 supplies logic vectors as inputs to the compiled representation of each cell in the order assigned in the queue in order to propagate the logic vectors through the integrated circuit design 460. As noted above, each logic vector represents a window of multiple cycles and the compiled representations are configured to perform bitwise operations on the logic vectors, and therefore the outputs of the cell over the window of the logic vectors are computed in parallel.

In the example of FIG. 4D, the logic vector propagator 240 may first compute the output of the first XOR gate 461 (a first level gate) by performing a bitwise XOR operation between the first input signal A (0b01010101=85) and the second input signal B (0b00110011=51) to compute an output (0b01100110=102). The logic vector propagator 240 may next compute the output of the second AND gate 464 (which is another first level gate) by performing a bitwise AND operation between the first input signal A (0b01010101=85) and the second input signal B (0b00110011=51) to compute an output of the second AND gate 464 (0b00010001=17).

After evaluating all of the level 1 (first level) cells, the logic vector propagator 240 continues by propagating the signals to level 2 (second level) cells. As such, the logic vector propagator 240 may next compute the output of the second XOR gate 462 by performing a bitwise XOR operation between the output of the first XOR gate 461 (a first level cell) (0b01100110=102) and the third input signal $C_{in}$ (0b00001111=15) to compute an output S (0b01101001=105). The logic vector propagator 240 may next compute the output of the first AND gate 463 by performing a bitwise AND operation between the output of the first XOR gate 461 (0b01100110=102) and the third input signal $C_{in}$ (0b00001111=15) to compute an output (0b00000110=6).

Finally, the logic vector propagator 240 propagates the signals to the sole level 3 (or third level) cell, OR gate 465 by performing a bitwise OR operation between the output of the first AND gate 463 (a second level cell) (0b00000110=6) and the output of the second AND gate 464 (a first level cell) (0b00010001=17), resulting in output $C_{out}$ (0b00010111=23).

Figure 4E:
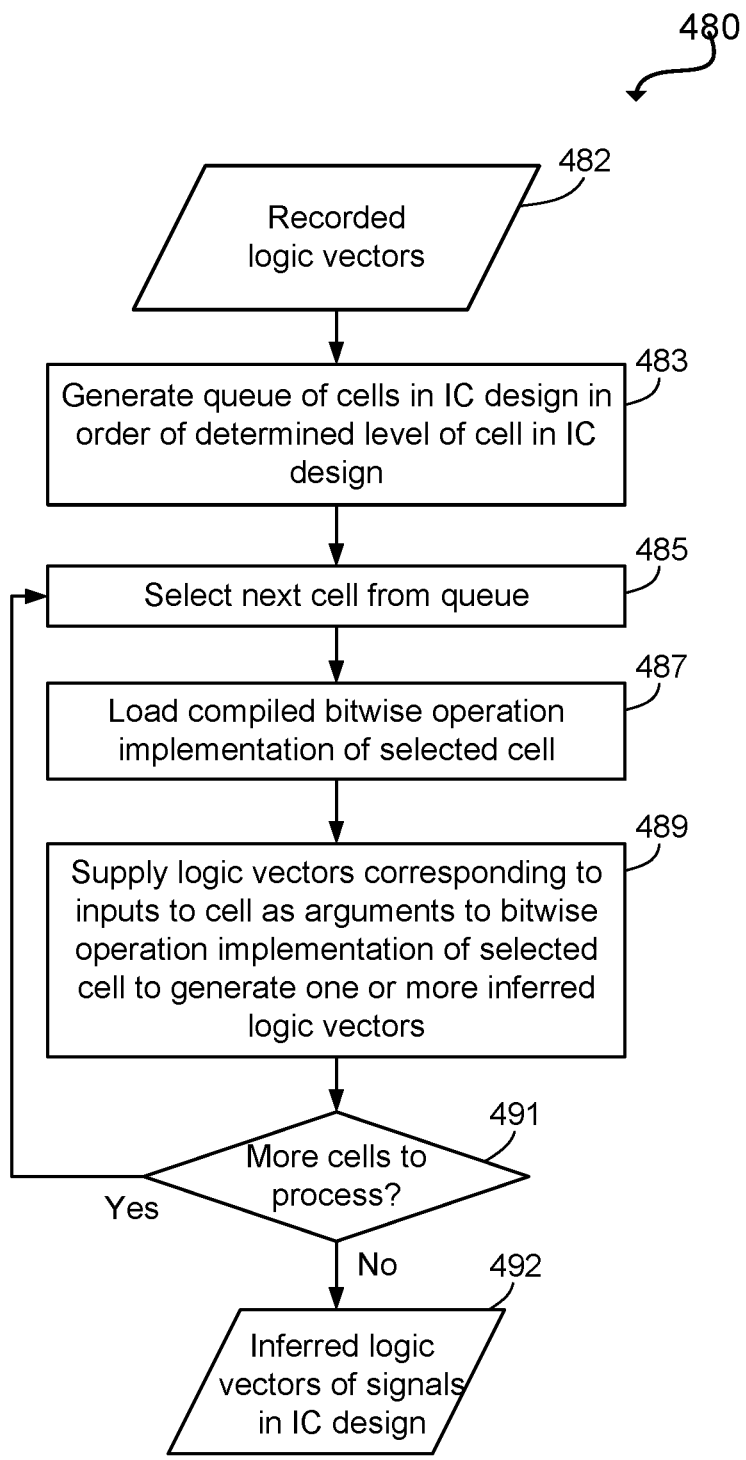
FIG. 4E depicts a flowchart of a method for propagating logic vectors through an integrated circuit design to compute inferred logic vectors according to one embodiment of the present disclosure.

FIG. 4E depicts a flowchart of a method 480 for propagating logic vectors through an integrated circuit design to compute inferred logic vectors according to one embodiment of the present disclosure. The logic vector propagator 240 receives recorded logic vectors 482 computed by the logic vector generator 230 and, at 483, generates a queue of all of the cells in the design, where the cells are queued in order of their respective levels within the design as determined at 413.

Beginning at 485, the logic vector propagator 240 iterates through the cells in the queue, such as by selecting a next cell from the head of the queue. At 487, the logic vector propagator 240 loads the previously compiled bitwise operation implementation of the selected cell.

At 489, the logic vector propagator 240 supplies the logic vectors that correspond to inputs to the cell (e.g., recorded logic vectors or derived logic vectors, based on how the inputs to the cell are driven) to compute one or more outputs of the cell. As noted above, in some embodiments, each logic vector is represented by a single data word (e.g., a 64-bit word) or a bit vector having a length less than or equal to a bit-width of a vector register (e.g., a 512-bit SIMD vector register). Accordingly, the bitwise operation implementation of the behavior of the selected cell computes the output vectors in parallel over the multiple clock cycles of a window of clock cycles represented by the logic vector (e.g., in parallel over the 64 clock cycles represented by a 64-bit logic vector stored as a single 64-bit data word).

At 491, the logic vector propagator 240 determines if there are more cells to process, such as by determining whether the queue contains more cells to be processed. In the case where the queue is not empty, the logic vector propagator 240 proceeds to selected a next cell from the queue at 485. In the case where the queue is empty and all cells have been processed, the logic vector propagator 240 returns the inferred logic vectors 492 computed through the propagation of the recorded logic vectors 482 through the integrated circuit design.

Referring to FIG. 2, at 245, the processor determines if there are more value changes among the value changes 202 to be processed. If so, then the value change reader 210 continues reading value changes 202 to be provided to the logic vector generator 230 to generate logic vectors for additional windows of clock cycles. The logic vectors generated for different windows of clock cycles may be non-overlapping windows of clock cycles, at least because some embodiments of the present disclosure assume that there are no inter-cycle dependencies in the evaluation of the signals of the cells when performing logic signal propagation, and therefore using overlapping windows would result in redundant computations.

Accordingly, aspects of embodiments of the present disclosure accelerate the propagation of logic signals through integrated circuit designs by computing the values of the signals propagated through the IC design on a per-cycle basis in parallel across a large number of cycles (e.g., over a window of cycles, such as a window of 64 cycles or 512 cycles, in accordance with the width of scalar words or vector registers of a processor). These per-cycle signals are used to reconstruct the states of the cells, which are then used to compute power characteristics of the cells on a per-cycle basis. The per-cell power characteristics may then be aggregated to compute power characteristics of the design (e.g., an integrated circuit or a sub-circuit of the design) on a per-cycle basis, as described in more detail below.

After the logic vectors are propagated through a cell, a cell power calculator 250, implemented by a processor executing instructions, calculates power values of corresponding cycle times corresponding to the logic vectors. For example, a computer readable medium stores instructions that, when executed by a processor, implements cell power calculators 250 according to various embodiments.

Figure 5:
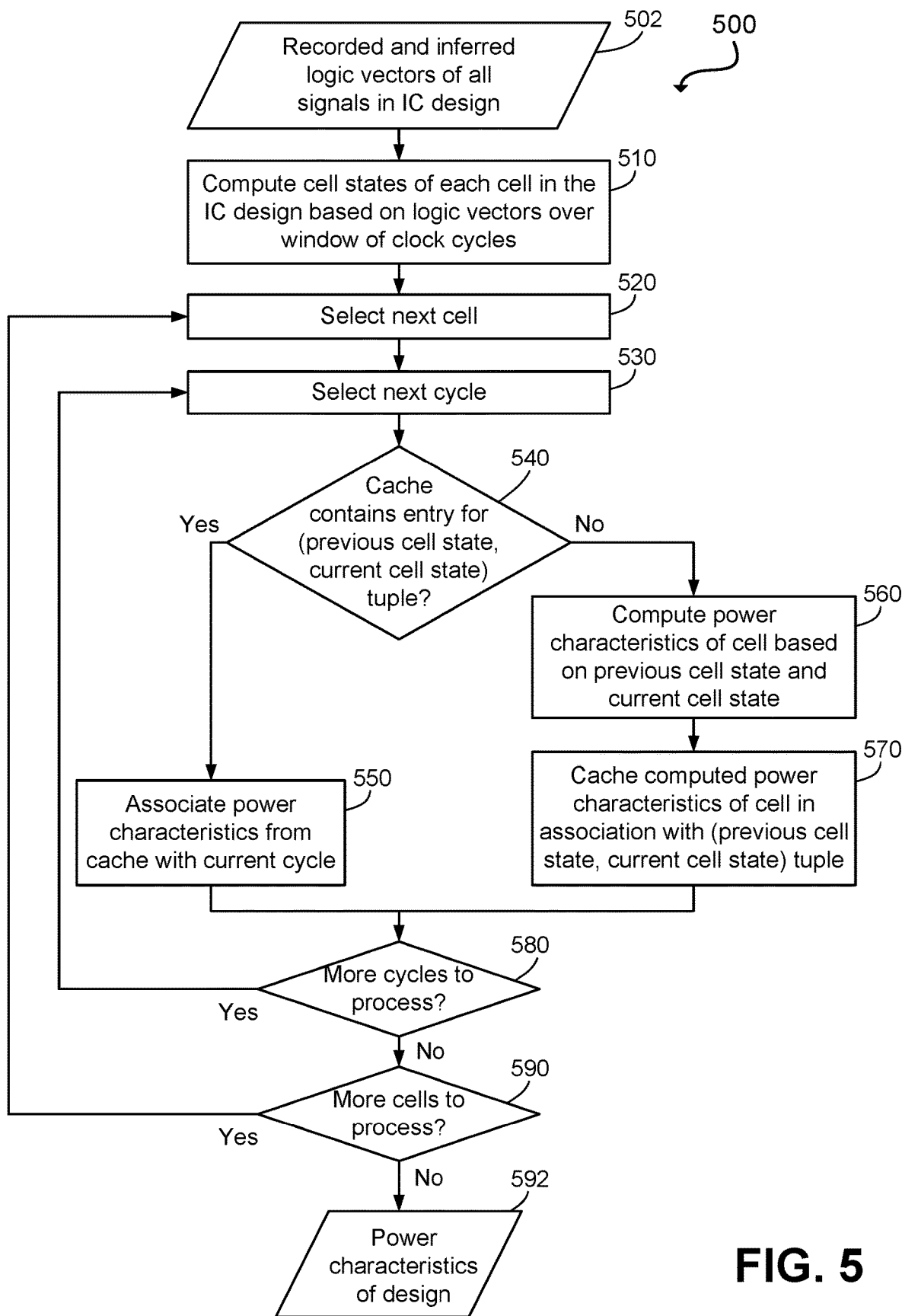
FIG. 5 is a flowchart of a method for computing per-cycle power characteristics of a design by a cell power calculator according to one embodiment of the present disclosure.

FIG. 5 is a flowchart of a method 500 for computing per-cycle power characteristics of a design by a cell power calculator 250 according to one embodiment of the present disclosure. As shown in FIG. 5, at 510 the cell power calculator 250 computes cell states of each cell in the IC design based on the logic vectors of all signals (including the recorded logic vectors and the inferred logic vectors) in the IC design 502, which were computed from the logic vectors of recorded signals by the logic vector propagator 240. Some aspects of embodiments relate to storing the logic state of each cell in the design at every cycle time (during each cycle), where the logic state of each cell is derived from the logic vectors of nets connected to the cell, such as by a Boolean vector or a bit vector indexed by the pins of the cell.

For example, the logic vectors associated with the inputs and outputs of the first XOR gate 461 shown in FIG. 4D are the first input signal A (0b01010101=85), the second input signal B (0b00110011=51), and its output signal (0b01100110=102). Therefore, each cell state of the first XOR gate 461 may be expressed as a Boolean vector or bit vector of length 3, as shown in Table 3, below.

TABLE 3

| Time/cycle number | Input A | Input B | Output |
|---|---|---|---|
| 1 | 1 | 1 | 0 |
| 2 | 0 | 1 | 1 |
| 3 | 1 | 0 | 1 |
| 4 | 0 | 0 | 0 |
| 5 | 1 | 1 | 0 |
| 6 | 0 | 1 | 1 |
| 7 | 1 | 0 | 1 |
| 8 | 0 | 0 | 0 |

In some embodiments, cells in the IC design are classified into two types: small cells and large cells. A small cell has a number of pins that is less than or equal to the number of bits in a data word of the processor executing the power cell calculator, such that the bit vector representing a cell state can fit into a single data word (e.g., 64 bits in the case of a 64 bit processor). A large cell is a cell with more pins than the number of bits in a data word of the processor. In general, most cells in an IC design will be small cells. Accordingly, some aspects of embodiments relate to representing a cell state of a small cell using a single data word. This enables cell states to be compared and operated on by the cell power calculator 250 using few CPU instructions (e.g., single comparisons and/or single bitwise operators), thereby improving the computational efficiency of performing operations on cell states for small cells (the vast majority of cells).

At 520, the cell power calculator 250 iterates over the cells in the IC design by selecting a next cell in the IC design, and at 530, the cell power calculator 250 iterates over the cycles for which it has access to cell states by selecting a next cycle.

At 540, the cell power calculator 250 determines whether a cache contains an entry for the power characteristics of the cell in the current cycle, based on the current cell state and the previous cell state (e.g., a tuple of previous cell state and current cell state). Because each cell state of a small cell can be represented as a single data word (e.g., single integer), each cell state may be represented as a tuple of two data words (a pair of data words) representing the previous cell state and the current cell state. In a case where there is such a corresponding entry, then at 550 the cell power calculator 250 associates the power characteristics from the cache with the current cycle (e.g., a data structure corresponding to the current cycle of the cell includes a pointer to the power characteristics in the cache corresponding to the current cycle. In a case where there is no corresponding entry in the cache, then at 560 the cell power calculator 250 computes power characteristics of the cell for the current cycle based on the previous cell state (the state of the cell during the previous cycle) and the current cell state and associates the computed power characteristics with the current cycle.

The major components of power consumption are static power and dynamic power. Static power includes leakage power, and dynamic power includes switching power and internal power. Switching power is the power consumed when charging the output loads of the cell. Internal power is short circuit power and power charging internal loads of the cell. Other power information about a cell is retrieved from existing cell characterization information, such as Liberty power characterization and from previously-performed static timing analysis, where this other power information is available in a design database 220 of cells (e.g., library cells).

Dynamic power of a cell depends on ramp time of input transition, capacitive load of output transition and the states of the cell. Aspects of embodiments relate to computing transitions based on the current state of the cell and the previous state of the cell based on static timing analysis computed by the static timing analyzer 260 (implemented by a processor executing instructions) computed from cell information from the design database 220 (e.g., ramp times at input and output pins of the cell). After computing the transitions at each of the pins (whether the pin has transitioned from 0 to 1 or from 1 to 0 between the previous state and the current state, or has remained at the same value of 0 or the same value of 1 in both the previous state and the current state) and the transition timing information computed by the static timing analyzer 260, the dynamic power of the cell during the current cycle (the switching and internal power values) can be calculated based on cell power characterization information (retrieved from the design database 220) regarding the associated computed transitions.

After the switching power, internal power, and leakage power values are calculated, they are cached at 570 based on the current and previous states of the cell (e.g., in association with a (previous cell state, current cell state) tuple) and will be retrieved and reused when the same states of the cell occur in later analysis (e.g., as determined at 540).

Leakage power is the stable state power and can be non-zero even there is no activity on the cell (e.g., no transitions at the input pins and output pins). Leakage power changes whenever the state of the cell changes and therefore the cell power calculator 250 calculates the leakage power at 560 based on such changes. Instead of absolute leakage power, some aspects of embodiments relate to tracking changes in leakage power on each cell during each cycle so that the leakage power is updated only when the state of the cell changes. Cell leakage power is also cached at 570 based on the current state of the cell and will be retrieved and reused when the same state occurs on the cell in later analysis.

At 580, after determining the power characteristics of the current cell during the current cycle, the cell power calculator 250 determines whether there are more cycles to process for the current cell. If so, then the cell power calculator 250 proceeds with the cell state for the next cycle at 530. If there are no additional cycles to process for the current cell, then at 590 the cell power calculator 250 proceeds with calculating power information for another cell in the design at 520.

Accordingly, the cell power calculator 250 computes per-cycle power characteristics (dynamic power and static power) for each cell in the design at 592. FIG. 4D includes exemplary graphs 471, 472, 473, 474, and 475 of cell power consumption on a per-cycle basis in association with each corresponding cell (or gate) including cells 461, 462, 463, 464, and 465 in the sub-circuit 460 (the depicted cell power is shown for illustrative purposes and are not necessarily representative of actual relative power consumption for the illustrated gates).

A cycle power calculator 270 implemented by a processor executing instructions aggregates the per-cycle power characteristics calculated for the large numbers of individual cells of the IC design into per-cycle power characteristics data 280 for the entire IC design and/or various sub-circuits thereof (e.g., particular sub-circuits configured to perform particular functions). For example, a computer readable medium stores instructions that, when executed by a processor, implements cycle power calculators 270 according to various embodiments. For example, in some embodiments the cycle power calculator 270 sums the power characteristics of the cells of a sub-circuit (or the full IC design) during a cycle to compute the overall power characteristics of the sub-circuit (or the full IC design) during the cycle, and may perform this aggregation for each cycle in the analysis.

After logic vector propagation and power characteristic computations are completed for a current collection of logic vectors for a particular window of cycles (or window of cycle times or window of clock cycles), a report generator 290 implemented by a processor executing instructions collects and processes the updated cell power values. For example, a computer readable medium stores instructions that, when executed by a processor, implements report generators 290 according to various embodiments. In some embodiments, the report generator 290 outputs cycle-accurate power information as it is generated (e.g., while power information is concurrently being calculated for other cycles, such as during VC reading by the value change reader 210 and logic vector generation by the logic vector generator 230). For example, in some embodiments, cycle-accurate power values are automatically output for specific sub-circuits in the IC design.

In some embodiments, the report generator 290 also calculates averaged power information for the IC design based on per-cycle power characteristics. As one example, the report generator 290 averages per-cycle power consumption (e.g., dynamic power) over a time period that includes multiple cycles (e.g., over 1,000 cycles) to compute average power information (e.g., dynamic power consumption) for that period. In various embodiments, the average power analysis is performed on a per-sub-circuit basis or over the entire IC design.

When the processor determines at 245 that all of the value changes 202 have been processed to compute the per-cycle power, then the report generator 290 generates a final report regarding the power characteristics of the design based on the value changes 202, where the final report is exported for further analysis or other stages of a workflow for an IC design.

To improve runtime performance, some aspects of embodiments relate to performing various portions of the process of computing per-cycle power characteristics and average power characteristics concurrently and/or in parallel, in addition to the parallelized propagation of logic signals by the logic vector propagator 240.

In more detail, in some embodiments, the various components shown in FIG. 2, including the value change reader 210, the logic vector generator 230, the logic vector propagator 240, the cell power calculator 250, the cycle power calculator 270, and the report generator 290 are implemented in different computational threads or different computational processes (e.g., a computer program executed by one or more threads). Different threads or processes may execute concurrently and may be executed by the same processing core or different processing cores of a multi-core and/or multi-processor computer. A thread supervisor or a scheduler, which is typically a part of an operating system, manages the execution of different threads of different processes across the one or more cores of a computer system. In addition, different threads may be executed by different hosts (or different computers) in a distributed computing system or a cluster of computing systems, such as multiple hosts or virtual machines in a cloud computing environment or data center.

Figure 6A:
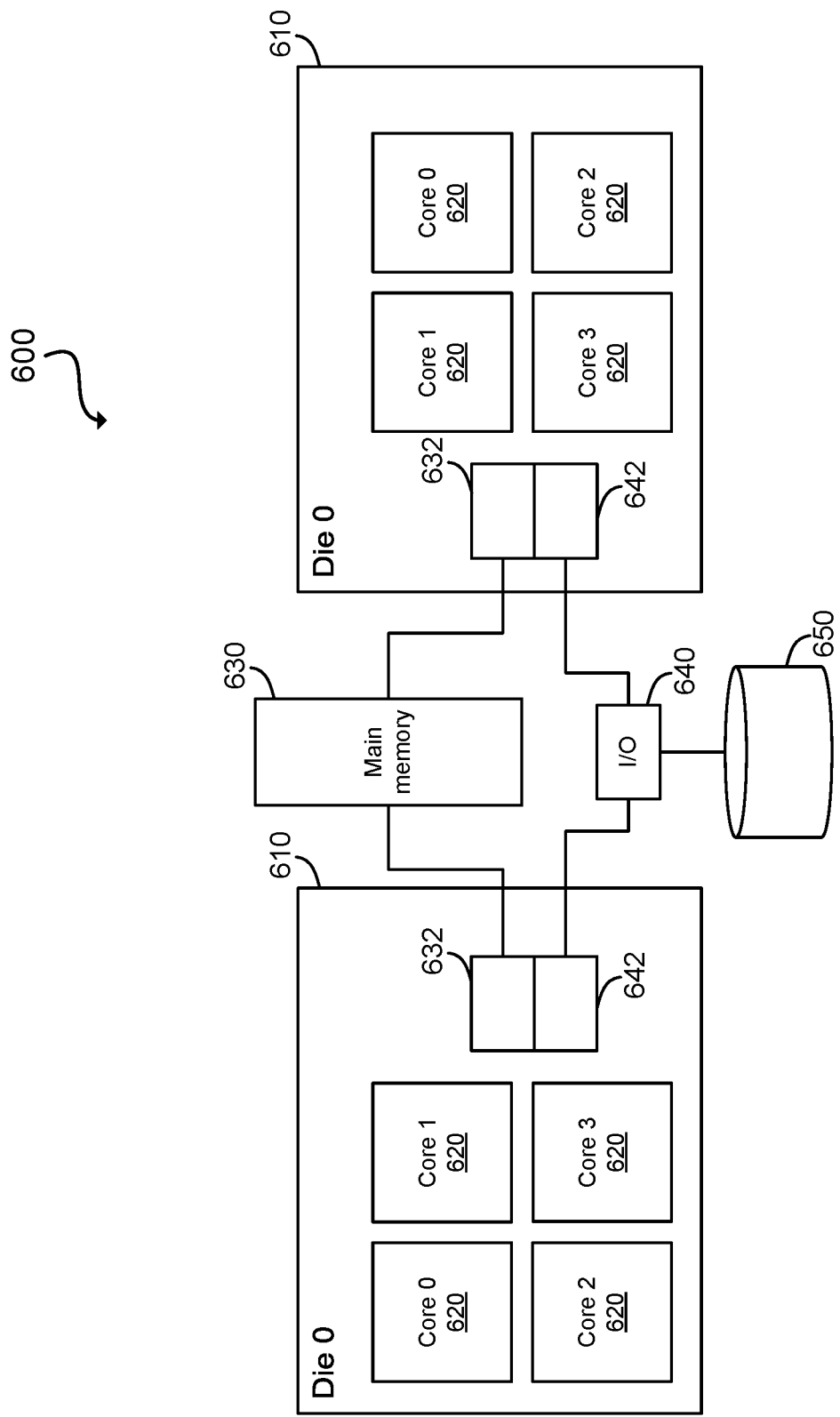
FIG. 6A is a schematic depiction of a multi-core host computer system suitable for executing some embodiments of the present disclosure.

FIG. 6A illustrates a multi-core architecture system or host 600 having two processor dies 610 (namely, Die 0 and Die 1), although embodiments of the present disclosure are not limited thereto and may include more than two processor dies 610. The processor dies 610 may correspond to the processing device 902 in FIG. 9.

Referring to FIG. 6A, each die 610 includes four processing cores 620. While FIG. 6A shows embodiments where each die 610 includes four cores 620, embodiments of the present disclosure are not limited thereto, and each die 610 may include one or more cores. The cores within each die 610 may have the same architecture (a homogeneous computing architecture) or different architectures (a heterogeneous computing architecture), such as where some cores are designed for low power and exhibit low performance while other cores are designed for high performance and exhibit high power consumption. Each core 620 may have separate functional units, for example, a scalar execution unit (for traditional instructions or scalar instructions, such as an x86 execution unit or Arm A64 instruction set execution unit) and a vector execution unit (for software designed for vector instruction sets such as variants of Intel® Streaming SIMD Extensions (SSE) and Intel® Advanced Vector Extensions (AVX) or ARM® NEON®). Main memory 630 (corresponding, e.g., to main memory 904 of FIG. 9) is shared between the multiple dies (e.g., two dies) 610, which access the main memory 630 through corresponding memory controllers 632, which may be integrated into the dies 610 or separate from the dies 610. The dies 610 and the main memory 630 are connected to an input/output (I/O) interface 640 via I/O controllers 642 that access external devices data storage devices 650 (e.g., hard disk drives, solid state drive, network controllers configured to connect to network attached storage, which may correspond to data storage device 918 of FIG. 9) or other non-volatile storage devices via interfaces such as Peripheral Component Interconnect Express (PCIe), which may correspond to bus 930 of FIG. 9.

Figure 6B:
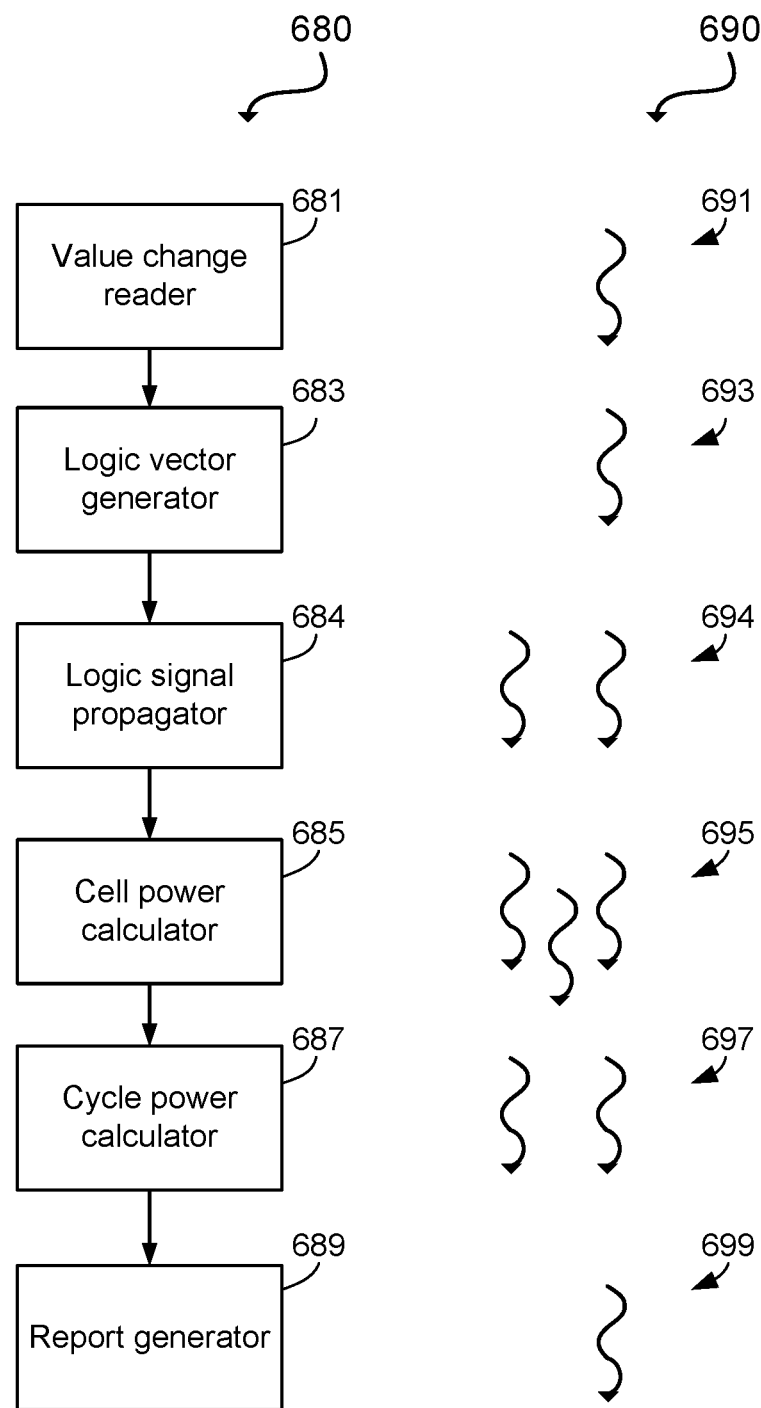
FIG. 6B is a schematic depiction of parallelizing the execution of a multi-cycle power calculation though pipelining according to one embodiment of the present disclosure.

Parallelism is achieved in the system of FIG. 6A by assigning different cores 620 to different threads. For example, some of the cores 620 can be assigned to operate a scheduler for scheduling threads among the various cores, some of the cores 620 may be configured to execute the value change reader 210, which may read VC data 202 from the data storage device 650 via the I/O interface 640. Others of the cores 620 may be assigned by the scheduler to perform various other stages, such as the logic vector generator 230, the logic vector propagator 240, the cell power calculator 250, the cycle power calculator 270, and the report generator 290. Results computed by various of these stages may be written back to the main memory 630 (and/or system caches such as L1 caches within the cores 620 and L2 caches in the dies and shared between the cores 620) where the data may be loaded by a later stage of the multi-cycle power analysis 200 pipeline 680 (as shown in FIG. 6B). The assignment of threads to cores is not fixed or permanent, and the same thread may be suspended on one core and later resumed by a different core in accordance with the computational demands (e.g., parts of the pipeline that require more work to be performed).

The process of subdividing and assigning individual cores 620 and/or dies 610 to parallelizable tasks improves the performance of the system. For example, on a Linux system, software may be organized into "threads," and threads may be assigned to specific CPUs and memory systems via the kthread_bind function when the thread is created. A thread of execution refers to the smallest sequence of programmed instructions that can be managed independently by a scheduler or a supervisor. Different threads can be executed concurrently by the same processor core and/or in parallel across multiple processor cores on a same die or spread across multiple dies. In addition, some processor cores support simultaneous multithreading (SMT) (e.g., referred to as Hyper-Threading Technology in Intel® processors), where one such physical core appears as multiple virtual cores that perform operations in parallel. Furthermore, threads enable multiple cores to perform operations concurrently, such as where one thread may execute on a core while another thread is blocked (e.g., while waiting for data to be loaded via the I/O controller). Accordingly, computational work can be spread across multiple threads and assigned to different cores (and/or virtual cores in the case of cores supporting SMT) by a scheduler to make use of a larger portion of the parallel and concurrent processing capabilities of computer systems, where the scheduler may maintain a table of the associations between threads and assigned cores.

As one example, the value change reader 210 reads value changes 202 that may be stored in a persistent data store or mass data store, such as a hard drive, a solid state drive, or a network attached storage. Accessing the data typically incurs long latency, and therefore the value change reader 210 may need to wait a significant amount of time (e.g., tens of milliseconds) to receive value change data, and therefore a thread that executes the value change reader 210 may be blocked from further progress until the request for data is completed. In such a case, a scheduler may cause another thread to run on the core that was executing a thread associated with the value change reader 210. The other thread may be, for example, a thread associated with the logic vector generator 230 to generate logic vectors associated with value changes that were previously read and stored in memory by the value change reader 210.

Various stages in a multi-cycle power analysis 200 as shown in FIG. 2 depend on the outputs of previous stages. The logic vector generator 230 depends on value changes loaded by the value change reader 210. The logic vector propagator 240 depends on receiving logic vectors from the logic vector generator 230. The cell power calculator 250 depends on inferred logic signals computed by the logic vector propagator 240. The cycle power calculator 270 depends on the per-cycle cell power computed by the cell power calculator 250. As such, the various stages in the multi-cycle power analysis 200 may be viewed as a pipeline, where different stages of the multi-cycle power analysis 200 may be performed by different threads working concurrently on different collections of logic values corresponding to different windows of clock cycles, where later stages of the pipeline operate on results produced by earlier stages of the pipeline.

FIG. 6B is a schematic depiction of distributing the execution of a power calculation for an integrated circuit design by pipelining the computation across multiple threads according to one embodiment of the present disclosure. As shown in FIG. 6B, different stages of a pipeline 680 for computing per-cycle power properties of an integrated circuit. Different stages may be performed by one or more worker threads 690 that are configured with instructions to perform the operations of the different stages, such as VC reader threads 691 configured to implement a value change reader 681, logic vector generator threads 693 configured to implement a logic vector generator 683, logic vector propagator threads 694 configured to implement a logic vector propagator 684, cell power calculator threads 695 configured to implement a cell power calculator 685, cycle power calculator threads 697 configured to implement a cycle power calculator 687, and report generator threads 699 configured to implement a report generator 689.

In addition, different stages may require different levels of computational effort, and therefore multiple threads may operate concurrently on the same stage. For example, the logic vector generator 683 may be able to generate logic vectors representing windows of clock cycles much more quickly than the cell power calculator 685 is able to compute per-clock cycle power information for those windows of clock cycles. As such, a single thread running on a single core may be sufficient to keep the pipeline full (e.g., all cores of the computer running) while multiple threads may concurrently execute cell power calculators 685 on different collections of logic vectors corresponding to different windows of clock cycles. As such, different stages may have different numbers of worker threads 690 assigned to perform the work associated with those stages of the pipeline. The number of threads allocated to any particular stage may depend on the relative computational workloads of the different stages.

A scheduler implemented by a processor executing instructions (e.g., a scheduler implemented within an operating system or other thread coordination system or supervisor) schedules the worker threads 690 to be executed on one or more processing cores 620 among the one or more processor dies 610. For example, the VC reader threads 691 and the logic vector generator threads 693 may be executed by Core 0 of Die 0, the logic vector propagator threads 694 may be executed by Core 1 and Core 2 of Die 0, and the cell power calculator threads 695 may be executed by Core 0, Core 1, and Core 2 of Die 1. All of these threads may be executed concurrently (with overlapping and/or interleaved execution) and some of these threads may be executed in parallel (e.g., executed at the same time by different cores of the processor).

In addition, for designs with long simulation time (e.g., many value changes over large number of cycles), in some embodiments the entire simulation time is divided into time windows, where the analysis for different time windows is performed on different hosts in computing cluster (e.g., in a data center) and performed in parallel. A supervisor may also manage the distribution of threads across among different hosts, such as by coordinating the distribution of different value changes to different hosts (different physical computing devices such as different servers) such that local schedulers running on the different hosts schedule threads running locally on those hosts to process various portions of the pipeline. In addition, in some embodiments, different parts of the pipeline 680 may be performed by different hosts. The results from the different time windows are then combined to obtain overall power results of the IC design over the entire simulation time.

In addition, in some embodiments, different clusters of the design may be processed on different hosts or in different threads. As noted above, at 415 the integrated circuit design may be partitioned into multiple clusters, where there are no inter-cluster dependencies or where the outputs of upstream clusters are computed to generate recorded inputs to downstream clusters. Accordingly, different threads, in some embodiments executed by different hosts, perform power analysis for different clusters of cells (or sub-circuits) of the integrated circuit design. Some such approaches reduce the peak memory requirements of performing power analysis on a single host, because there are fewer cells to analyze in a cluster or sub-circuit than in the full IC design.

Accordingly, various aspects of embodiments of the present disclosure relate to computing cycle-accurate power characteristics of an integrated circuit design. Some aspects involve using logic vectors perform multi-cycle propagation of logic values through a design to compute the states of cells on a per-cycle basis, where the states of the cells are used to compute the power characteristics (e.g., dynamic power consumption and static power consumption) of a cell during a clock cycle. Some aspects further relate to caching computed power characteristics based on the states of the cells (e.g., the previous cell state and the current cell state) to avoid re-computation of power characteristics of states that have previously been seen. Some aspects of embodiments relate to the parallel processing of cycle-accurate power characteristics, including distributing a pipeline of computational work associated with calculating power characteristics across a plurality of processing cores.

As a result, aspects of embodiments of the present disclosure provides the benefits of analyses by simulation time and signals and produces results more quickly than event-based approaches while also being able to flush cycle accurate power information during computation.

Table 4 illustrates time and memory usage results between a typical event-based power analysis and a cycle-based power analysis according to one embodiment of the present disclosure. The typical event-based power analysis and a cycle-based power analysis are compared for four different design cases, where Case 1 and Case 2 are RTL FSDB activities, referring to value changes in an FSDB format, recorded from RTL simulation/emulation, and where Case 3 and Case 4 are 0 Delay FSDB activities, where value changes in an FSDB format are recorded from zero delay gate level simulation/emulation or other sources. RTL FSDB typically annotates activities on the essential signals so that propagation is needed to reconstruct value changes of other signals in the design. In some embodiments, gate level FSDB include value changes on all signals of the design and therefore no signal propagation is necessary (e.g., the processor generates recorded logic vectors from all of the recorded value changes, where these recorded logic values represent the logic vectors of all signals in the design and therefore it is not necessary to perform signal propagation to compute inferred logic vectors). The runtimes shown below include only time consumed by power analysis and excludes design loading, timing analysis, and the like. As shown below, embodiments of the present disclosure are approximately 10 times faster than the typical event-based approach.

TABLE 4

| Design | Activity type | Event-based analysis | | Cycle-based analysis | | Difference | |
|---|---|---|---|---|---|---|---|
| | | Runtime (s) | Memory usage (GB) | Runtime (s) | Memory usage (GB) | Runtime (s) | Memory usage (GB) |
| Case 1 | RTL FSDB | 2342 | 11 | 350 | 9.3 | 0.15 | 0.85 |
| Case 2 | RTL FSDB | 6601 | 8 | 414 | 7.6 | 0.06 | 0.95 |
| Case 3 | 0 Delay FSDB | 42545 | 6.4 | 811 | 5.7 | 0.02 | 0.89 |
| Case 4 | 0 Delay FSDB | 9391 | 47.8 | 795 | 38 | 0.08 | 0.79 |

Figure 7:
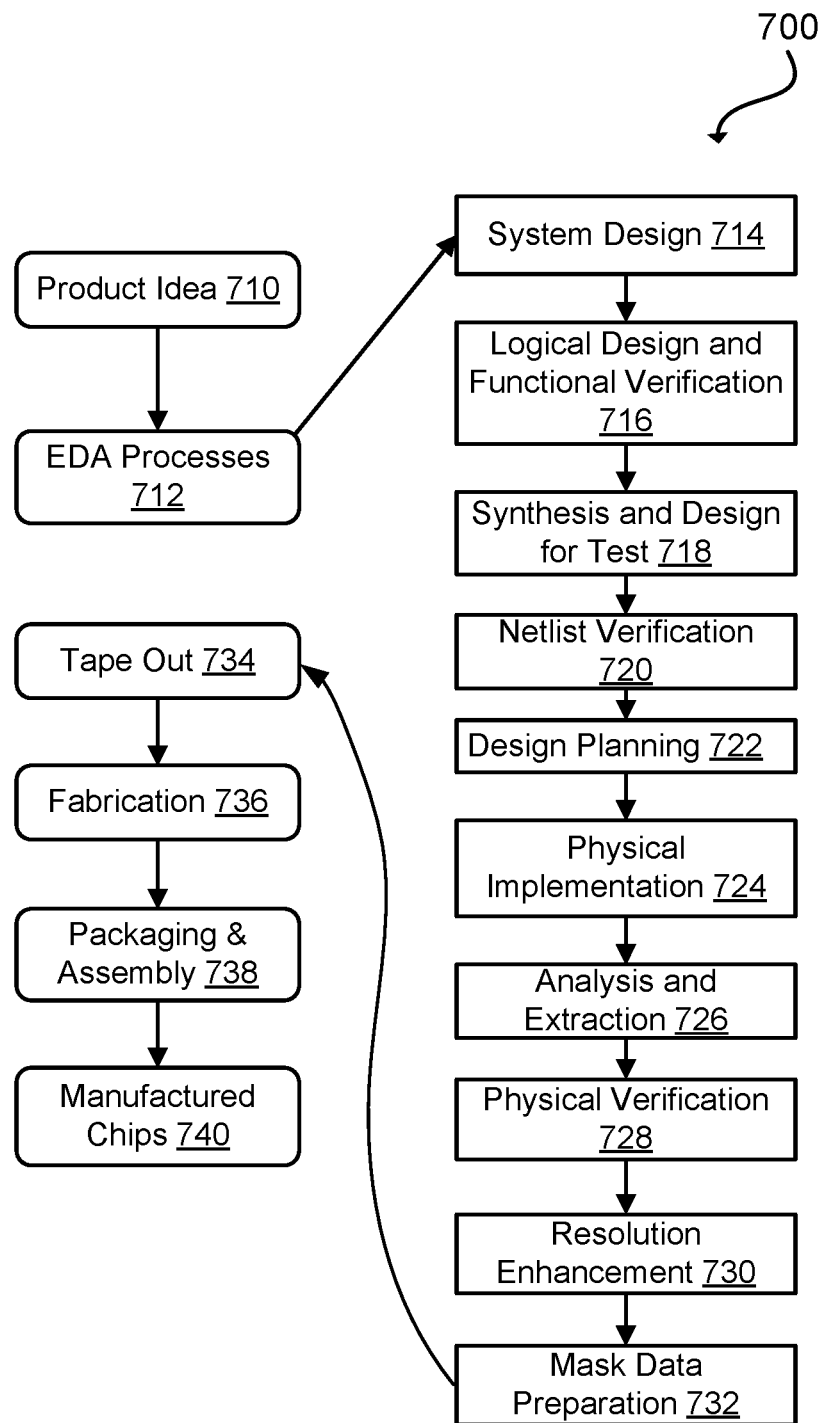
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
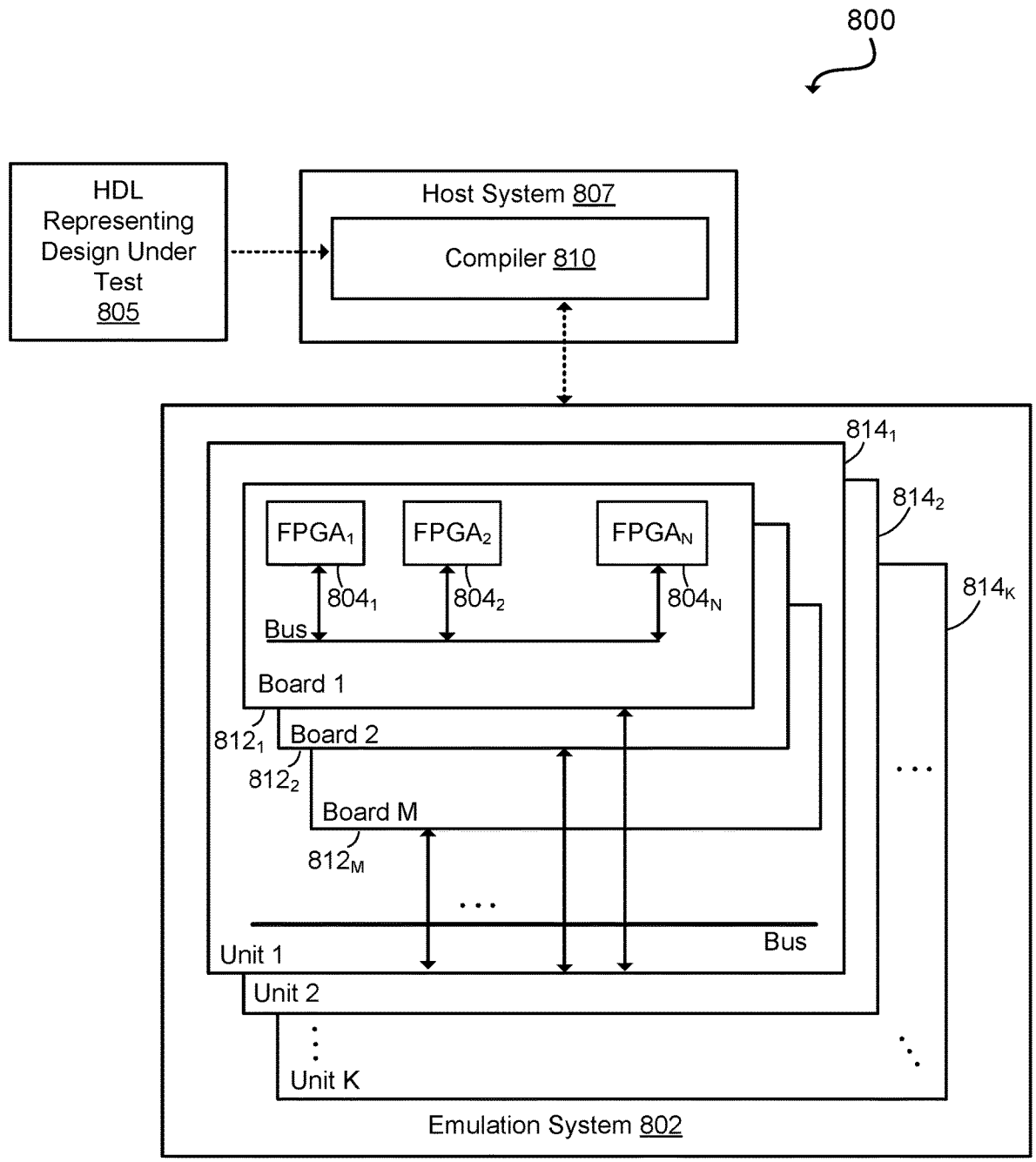
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAS, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
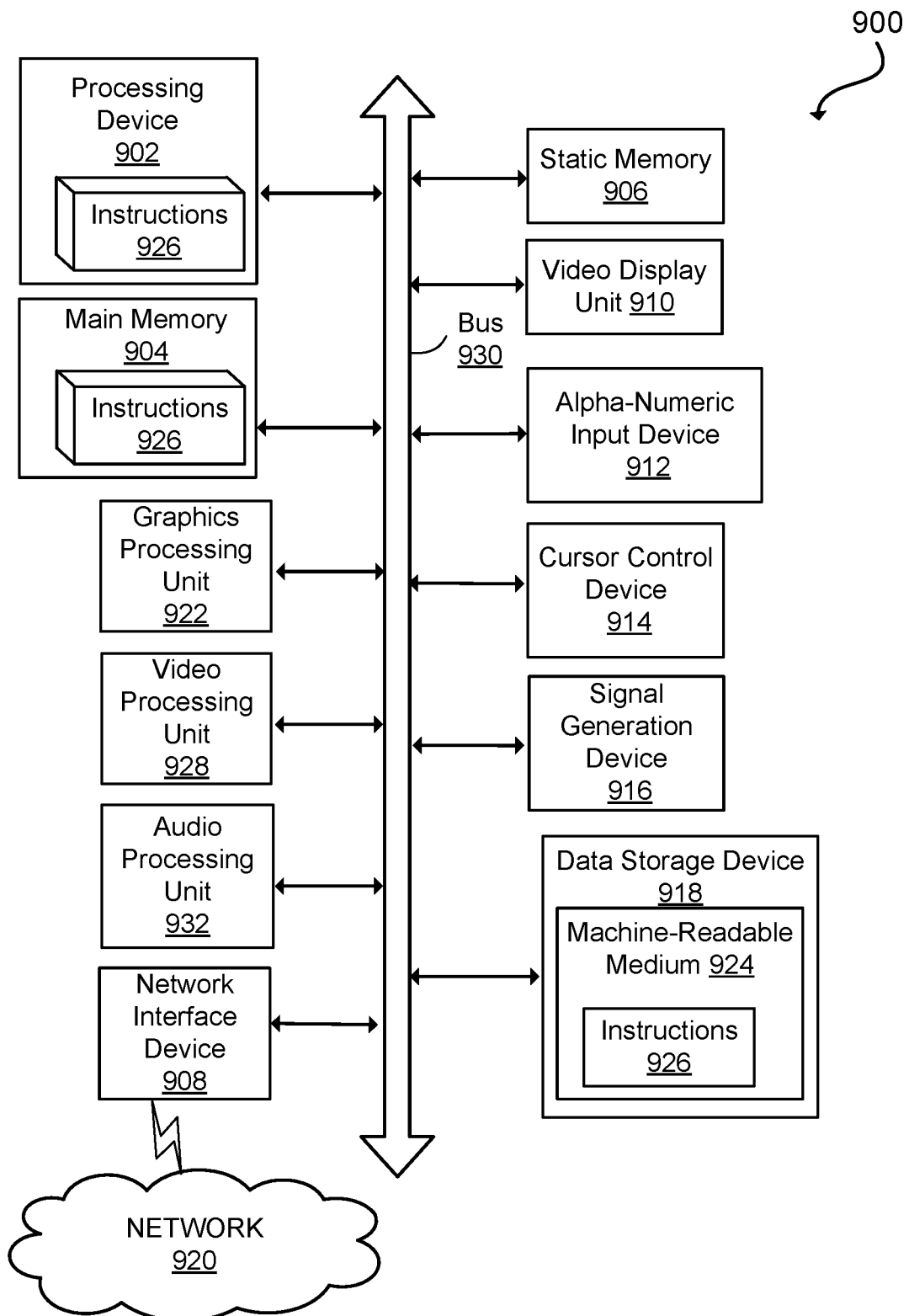
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
    a memory storing instructions; and
    a processor comprising an arithmetic logic unit configured to perform arithmetic operations on one or more operands, each operand having a bit width, coupled with the memory and to execute the instructions, the instructions when executed cause the processor to:
        receive a plurality of value changes corresponding to timestamped logic value changes in a plurality of recorded signals from a verification run of an integrated circuit design;
        generate a plurality of recorded logic vectors from the plurality of value changes, each recorded logic vector comprising a plurality of recorded logic values over a window of consecutive clock cycles for a recorded signal of the plurality of recorded signals, each logic vector having a length less than or equal to the bit width and being stored in a single data word having a size equal to the bit width;
        determine a plurality of inferred logic vectors comprising a plurality of inferred logic values corresponding to signals output by a plurality of cells of the integrated circuit design based on propagating the plurality of recorded logic values through the plurality of cells;
        compute per-cycle power characteristics of the integrated circuit design based on the plurality of recorded logic vectors and the plurality of inferred logic vectors; and
        output the per-cycle power characteristics of the integrated circuit design in order of timestamp from the verification run.

2. The system of claim 1, wherein the plurality of inferred logic values of the window of consecutive clock cycles are computed in parallel.

3. The system of claim 1, wherein the memory further stores instructions when executed cause the processor to:
    determine a level of each cell in the integrated circuit design based on a maximum number of steps through the integrated circuit design from a recorded signal to an input of the cell, and
    wherein the instructions to propagate the plurality of recorded logic values through the plurality of cells of the integrated circuit design comprise instructions that when executed cause the processor to add the plurality of cells of the integrated circuit design to a queue in order of level.

4. The system of claim 3, wherein the memory further stores instructions when executed cause the processor to compile bitwise operation implementations of behaviors of the plurality of cells of the integrated circuit design, the behaviors of the plurality of cells comprising functions mapping inputs to the plurality of cells to outputs of the plurality of cells, and wherein the instructions to propagate the plurality of recorded logic vectors through the plurality of cells of the integrated circuit design comprise instructions that when executed cause the processor to, for each cell in the queue, supply logic vectors provided as inputs to the cell to a corresponding compiled bitwise operation implementation of the behavior of the cell to compute the plurality of inferred logic vectors.

5. The system of claim 3, wherein the memory further stores instructions when executed cause the processor to divide the plurality of cells of the integrated circuit design into a plurality of clusters comprising a first cluster of cells and a second cluster of cells, where the first cluster and the second cluster are independent of one another for logic propagation, and wherein the instructions to propagate the plurality of recorded logic vectors through the plurality of cells of the integrated circuit design comprise instructions that when executed cause the processor to:

propagate the plurality of recorded logic vectors through the first cluster of cells in a first thread executed by a first core of the processor; and concurrently propagate the plurality of recorded logic vectors through the second cluster of cells in a second thread executed by a second core of the processor.

6. The system of claim 1, wherein the instructions to compute the per-cycle power characteristics comprise instructions when executed cause the processor to:

compute a plurality of cell states of the plurality of cells based on the plurality of recorded logic vectors and the plurality of inferred logic vectors;

compute power characteristics of each cell for each cycle based on a previous cell state during a previous cycle and a current cell state during a current cycle; and store the computed power characteristics in a cache in association with the previous cell state and the current cell state.

7. The system of claim 6, wherein the instructions further comprise instructions that when executed cause the processor to compute the power characteristics by:

determining that the cache includes an entry for the cell in association with the previous cell state and the current cell state and associating the power characteristics from the cache with the current cycle of the cell.

8. The system of claim 6, wherein the instructions further comprise instructions that when executed cause the processor to compute the power characteristics by:

determining that the cache does not include an entry for the cell in association with the previous cell state and the current cell state;

computing the power characteristics based on transitions determined from the previous cell state and the current cell state and static timing analysis of the cell; and caching the computed power characteristics in the cache in association with the previous cell state and the current cell state.

9. A non-transitory computer readable medium comprising stored instructions that, when executed by a processor, cause the processor to:

generate a plurality of recorded logic vectors from a plurality of value changes from a verification run of an integrated circuit design, each recorded logic vector comprising a plurality of recorded logic values over a window of consecutive clock cycles, each logic vector having a length less than or equal to a bit width of an arithmetic logic unit of the processor and being stored in a single data word having a size equal to the bit width;

determine a plurality of inferred logic vectors comprising a plurality of inferred logic values corresponding to signals output by a plurality of cells of the integrated circuit design based on propagating the plurality of recorded logic values through the plurality of cells; and compute per-cycle power characteristics of the integrated circuit design based on the plurality of recorded logic vectors and the plurality of inferred logic vectors.

10. The non-transitory computer readable medium of claim 9, wherein the stored instructions further comprise instructions that, when executed by the processor, cause the processor to compute the plurality of inferred logic values of the window of consecutive clock cycles in parallel.

11. The non-transitory computer readable medium of claim 9, further storing instructions that when executed cause the processor to:

determine a level of each cell in the integrated circuit design based on a maximum number of steps through the integrated circuit design from a recorded signal to an input of the cell; and compile bitwise operation implementations of behaviors of the plurality of cells of the integrated circuit design, the behaviors of the plurality of cells comprising logic functions mapping inputs to the plurality of cells to outputs of the plurality of cells.

12. The non-transitory computer readable medium of claim 9, wherein the instructions further comprise instructions that when executed cause the processor to:

add the plurality of cells of the integrated circuit design to a queue in order of level; and for each cell in the queue, supply logic vectors provided as inputs to the cell to a corresponding compiled bitwise operation implementation of a behavior of the cell to compute the plurality of inferred logic vectors.

13. The non-transitory computer readable medium of claim 9, wherein the instructions further comprise instructions that when executed cause the processor to:

compute a plurality of cell states of the plurality of cells based on the plurality of recorded logic vectors and the plurality of inferred logic vectors; and compute power characteristics of each cell for each cycle based on a previous cell state during a previous cycle and a current cell state during a current cycle.

14. The non-transitory computer readable medium of claim 9, further comprising stored instructions that when executed by the processor cause the processor to generate the plurality of recorded logic vectors in a first thread, determine the plurality of inferred logic vectors in a second thread, and compute the per-cycle power characteristics in a third thread.

15. The non-transitory computer readable medium of claim 9, further comprising stored instructions that when executed by the processor cause the processor to generate the plurality of recorded logic vectors in a first thread executed on a first processor of a first host, determine the plurality of inferred logic vectors in a second thread executed by a second processor of a second host, and compute the per-cycle power characteristics in a third thread executed on a third processor of a third host.

16. A method comprising:

generating a plurality of recorded logic vectors from a plurality of value changes from a verification run of an integrated circuit design, each recorded logic vector comprising a plurality of recorded logic values over a window of consecutive clock cycles, each logic vector having a length less than or equal to a bit width of an arithmetic logic unit of a processing device and being stored in a single data word having a size equal to the bit width;

determining a plurality of inferred logic vectors comprising a plurality of inferred logic values corresponding to signals output by a plurality of cells of the integrated circuit design based on propagating the plurality of recorded logic values through the plurality of cells; and computing, by the processing device, per-cycle power characteristics of the integrated circuit design based on the plurality of recorded logic vectors and the plurality of inferred logic vectors.

17. The method of claim 16, wherein the processing device is configured to compute the plurality of inferred logic values of the window of consecutive clock cycles in parallel.

18. The method of claim 16, further comprising:

determining a level of each cell in the integrated circuit design based on a maximum number of steps through the integrated circuit design from a recorded signal to an input of the cell; and compiling bitwise operation implementations of behaviors of the plurality of cells of the integrated circuit design, the behaviors of the plurality of cells comprising logic functions mapping inputs to the plurality of cells to outputs of the plurality of cells.

19. The method of claim 16, further comprising:

adding the plurality of cells of the integrated circuit design to a queue in order of level; and for each cell in the queue, supplying logic vectors provided as inputs to the cell to a corresponding compiled bitwise operation implementation of a behavior of the cell to compute the plurality of inferred logic vectors.

20. The method of claim 16, further comprising:

computing a plurality of cell states of the plurality of cells based on the plurality of recorded logic vectors and the plurality of inferred logic vectors; and computing power characteristics of each cell for each cycle based on a previous cell state during a previous cycle and a current cell state during a current cycle.

\* \* \* \* \*